(12) United States Patent
Ross et al.

(10) Patent No.: US 12,048,266 B2
(45) Date of Patent: Jul. 30, 2024

(54) SCREENING BELT UNIT FOR A HARVESTING MACHINE, AND CORRESPONDING FLAP UNIT

(71) Applicant: Grimme Landmaschinenfabrik Gmbh & Co. KG, Damme (DE)

(72) Inventors: Julian Ross, Eslohe (DE); Christoph Halbrügge, Wallenhorst (DE); Josef Gerdes, Loningen (DE); Franz-Bernd Kruthaup, Damme (DE); Heinrich Hönemann, Osnabrück (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 822 days.

(21) Appl. No.: 17/046,987

(22) PCT Filed: Apr. 11, 2019

(86) PCT No.: PCT/EP2019/059308
§ 371 (c)(1),
(2) Date: Oct. 12, 2020

(87) PCT Pub. No.: WO2019/197554
PCT Pub. Date: Oct. 17, 2019

(65) Prior Publication Data
US 2021/0251135 A1    Aug. 19, 2021

(30) Foreign Application Priority Data
Apr. 13, 2018  (DE) .......................... 1020181088795

(51) Int. Cl.
*A01D 17/10* (2006.01)
*B65G 15/52* (2006.01)

(52) U.S. Cl.
CPC ............ *A01D 17/10* (2013.01); *B65G 15/52* (2013.01); *A01D 2017/103* (2013.01); *B65G 2201/0202* (2013.01)

(58) Field of Classification Search
CPC .. A01D 17/10; A01D 2017/103; B65G 15/52; B65G 2201/0202
(Continued)

(56) References Cited

U.S. PATENT DOCUMENTS 3,061,077 A    10/1962  Noffsinger
3,392,819 A     7/1968  Waite
(Continued)

FOREIGN PATENT DOCUMENTS

AU    2018351472 A1    4/2020
DE         3234 C       5/1878
(Continued)

OTHER PUBLICATIONS

Office Action issued in corresponding Australia Application Serial No. 2019250512 issued on Feb. 13, 2024.

*Primary Examiner* — Michael McCullough
*Assistant Examiner* — Jessica L Burkman
(74) *Attorney, Agent, or Firm* — Husch Blackwell LLP

(57) ABSTRACT

A screening belt unit is provided for a harvesting machine or harvested material transportation device and for screening extraneous material out of a mixture of harvested material and extraneous material. A screening belt has at least two endless carriers, preferably in the form of carrier belts or chains, between which screening bars are arranged in a direction transversely to the conveying direction. The screening bars form a plurality of screening bar units that comprise in each case at least two screening bars. At least a part of the screening bars is fixed so as to be movable relative to the endless carriers. The screening belt unit has a (Continued)

positioning means arranged at least locally along the screening belt and acts on the movable screening bars and via which, in the screening zone S as seen in the screening direction, a spacing A in the conveying direction F of successive screening bars is defined. Furthermore, a flap unit, a screening belt and a harvesting machine or a harvested material transportation device are provided.

22 Claims, 23 Drawing Sheets

(58) Field of Classification Search
USPC .......................................................... 209/307
See application file for complete search history.

(56) References Cited

U.S. PATENT DOCUMENTS

| | | | |
|---|---|---|---|
| 4,787,461 | A | 11/1988 | Rogus |
| 4,892,509 | A | 1/1990 | Jager et al. |
| 5,099,548 | A * | 3/1992 | Loosli ................ F16G 3/02 |
| | | | 198/844.2 |
| 5,213,219 | A * | 5/1993 | Griffin .................. A01D 17/10 |
| | | | 209/665 |
| 5,697,451 | A | 12/1997 | Nicholson |
| 9,440,793 | B2 | 9/2016 | Matsuzaki et al. |
| 2014/0367230 | A1 | 12/2014 | Jager et al. |
| 2016/0066501 | A1 | 3/2016 | Altendorf et al. |
| 2021/0251135 | A1 | 8/2021 | Ross et al. |

FOREIGN PATENT DOCUMENTS

| | | | |
|---|---|---|---|
| DE | 2520605 | A1 | 11/1976 |
| DE | 3109209 | A1 | 11/1982 |
| DE | 3429004 | A1 | 2/1986 |
| DE | 20011436 | U1 | 10/2000 |
| DE | 102004045487 | A1 | 4/2006 |
| EP | 0133886 | A1 | 3/1985 |
| EP | 0312629 | A1 | 4/1989 |
| EP | 2813134 | | 12/2014 |
| EP | 2813135 | A1 | 12/2014 |
| FR | 2216901 | A1 | 9/1974 |
| JP | S44017154 | | 7/1969 |
| JP | S48039210 | | 9/1973 |
| JP | S5438289 | U | 3/1979 |
| JP | S52022480 | U | 3/1979 |
| JP | S57109590 | | 1/1984 |
| JP | 2013252499 | A | 12/2013 |
| JP | 2016149947 | A | 8/2016 |

* cited by examiner

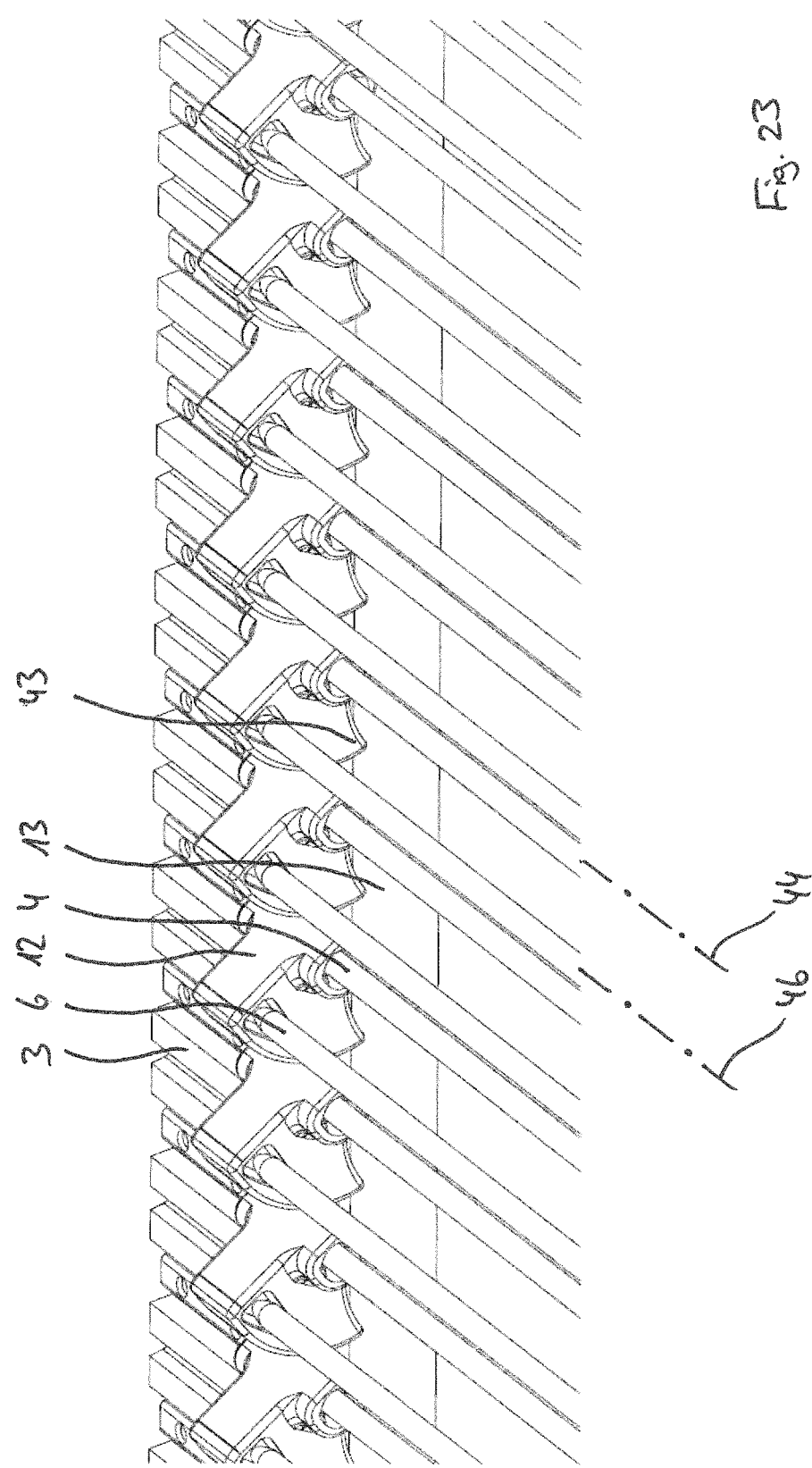

SCREENING BELT UNIT FOR A HARVESTING MACHINE, AND CORRESPONDING FLAP UNIT

CROSS REFERENCE

This application claims priority to PCT Application No. PCT/EP2019/059308, filed Apr. 11, 2019, which itself claims priority to German Application No. 10 2018 108879.5, filed Apr. 13, 2018, the entirety of both of which are hereby incorporated by reference.

FIELD OF THE INVENTION

The present invention relates to a screening belt unit for a harvesting machine, in particular for a root crop harvester, for screening extraneous material out of a mixture comprising harvested material and extraneous materials, in particular in the form of soil, clods and stones, wherein the screening belt unit comprises a screening belt, which has at least two endless carriers, preferably in the form of carrier belts or chains, between which screening bars are arranged in a direction transversely to the conveying direction, said screening bars forming a plurality of screening bar units that comprise in particular in each case at least two screening bars, wherein at least a part of the screening bars is fixed so as to be movable relative to the endless carriers.

BACKGROUND

In the harvesting of root crops, in particular potatoes, using a generic screening belt, undesired extraneous material in the form of earth is intended to be deliberately carried along to protect the harvested material, but is furthermore likewise intended to be deliberately removed from the mixture of harvested material and extraneous material. At the same time, a situation is intended to be avoided whereby, depending on the size of the harvested material to be screened and transported, fractions of harvested material that are too small drop through the screening belt or are squashed during transport.

To this end, DE 27 15 108 proposes varying the screening belt pitch such that additional transverse bars to be attached to the existing screening belts need to be fitted subsequently, said additional transverse bars resulting in a variation in the screening belt pitch. The additional transverse bars need to be fitted individually, this being associated with a corresponding outlay.

Furthermore, trap doors are known from the prior art, which are incorporated into a screening belt as additional components. The trap doors are closed in the screening zone in the upper strand and open under gravity in the lower strand. As a result, relatively large openings arise in the lower strand, which improve the self-cleaning of the screening belt on account of extraneous material dropping down out of the upper strand. The trap door is closed in the load strand and opens under gravity only in the return strand. In order to change the screening belt pitch, i.e. the effective spacing of the screening bars of the screening belt, the latter has to be removed and replaced. The associated expenditure of time during a harvesting operation, given frequently relatively narrow time frames, is disadvantageous.

SUMMARY OF THE INVENTION

It is the object of the present invention to minimize the effort required for changing the screening belt pitch.

According to the invention, the screening belt unit has a positioning means, which is arranged at least locally along the screening belt and acts on the movable screening bars and via which, in the screening zone, as seen in the screening direction, a spacing in the conveying direction of successive screening bars is defined and in particular settable in a variable manner. The positioning means acts either directly or indirectly on the movable screening or transverse bars. This results in a relative position of the movable screening bars with respect to the endless carriers such that, as seen in the screening direction, the spacings of the screening bars are varied by a changed position of the positioning means. The spacings of the screening bars can be varied here by shortening the spacing of consecutive screening bars in the vertical direction and in the conveying direction. It is essential that a movement, induced by the positioning means, of the screening bars arranged so as to be movable relative to the endless carrier varies the spacing of said screening bars from adjacent, fixed screening bars. This can take place by pivoting or rotating the movable screening bars which are attached, in particular rotatably or via a flexible joint part, to the endless carrier or to a screening bar connected fixedly to the endless carrier.

As a result of the arrangement of the positioning means, which is not deemed part of the screening belt, and the action thereof on the movable screening bars, the spacing of the successive screening bars can also be varied in the course of one and the same screening zone. For example, for this purpose, the positioning element, as seen in the screening direction, can keep or guide the movable screening bars at a spacing that varies, in particular a spacing that increases and/or decreases, over the course of the screening zone. In this way, over the course of a screening zone, with an increasing conveying path, the separation of the extraneous material from the harvested material can be carried out in a targeted manner. The change in the spacing in the conveying direction of successive screening bars is preferably simultaneously associated with a change in the spacing perpendicular to the conveying direction, resulting in an advantageous formation of pockets in the screening belt.

As a result of the formation according to the invention of a screening belt unit having screening bar units, which preferably each have one or more movably fixed screening bars, it is possible to dispense with replacing the screening belts in order to change the screening belt pitch. Likewise, the attachment, known from the prior art, of additional screening or transverse bars is dispensed with. The screening or transverse bars of the device according to the invention comprise both bars that extend perpendicularly between the two endless carriers and those that can be slightly obliquely angled, and in particular also bent screening bars.

Furthermore, it goes without saying that the endless carriers can be opened via known connecting means in a conventional manner for maintenance and repairs or for replacement on account of becoming worn. For this purpose, the endless carriers can have locks or other connecting regions opening the endless carrier.

The possibility of an arrangement of the screening bars, or of their longitudinal centre axes, that is at least partially stepped in a side view or in a longitudinal section makes it possible to overcome relatively large slopes with the root crops to be conveyed. By the formation of local conveying surfaces which have a smaller inclination in relation to a horizontal than the endless carriers, a greater height per conveying section can be overcome with the root crops without the root crops rolling down the screening belt unit counter to the conveying direction. This in turn leads to a lower requirement of the screening belt unit for construction space and to the possibility of shortening the screening belt or screening belts thereof.

At least a part of the screening belt unit is advantageously configured to be variable in position with respect to the endless carrier by the positioning means. The screening bar unit has in this case in particular the screening bar that is fixed in a movable manner relative to the endless carriers. Accordingly, a part of the screening bar unit is then configured to be variable in position relative to the endless carrier. Preferably, the part of the screening bar unit that is positionable in a variable position with respect to the endless carrier is a flap part, described below, which can be pivoted or rotated about at least one part of the screening bar unit that is arranged in a fixed position relative to the endless carrier or on the latter. In particular, the pivotable or rotatable part of the screening bar unit and thus the movable part thereof is mounted on the positioning element in a manner arranged downstream of the non-pivotable part of the screening bar unit in the direction of travel, this being advantageous for a drawing movement since fewer blockages of the pivotable parts in contact with the positioning means can occur. For a nevertheless optionally possible and in particular brief reversing operation of the screening belt for the purpose of resolving any blockages, the pivotable or rotatable part can then also be mounted in a leading manner.

According to a further embodiment of the invention, the screening bar unit may have a screening bar that is mounted eccentrically in cross section. This can be an oval bar or a bar that is round but provided with an axis of rotation mounted eccentrically within its outer surface. When these round bars are used, in order to vary the spacing of successive bars not every bar but for example only every second bar is adjusted. Preferably, however, the screening bar is one that is mounted so as to be rotatable or pivotable about a pivot axis and is spaced apart from an axis of rotation or pivot axis via a joint and any associated spacing means. It is thus possible according to the invention to use screening bars that are already known.

In particular, the screening bar unit is provided with at least one flap unit, which has at least one of the two screening bars, wherein the flap unit is pivotable or rotatable via at least one joint connected indirectly or directly to the endless carrier, and the positioning means is configured to influence an angular position of the flap unit. The flap unit thus has the screening bar to be pivoted. The angular position arises via an angle between the conveying direction and a longitudinal extent, proceeding in a radial direction from the axis of rotation or pivot axis, of the flap unit. For example, this longitudinal extent is defined, in the case of a screening bar unit having a screening bar fastened to the endless carrier and a screening bar arranged in a pivotable or rotatable manner with respect thereto, by a straight section that passes through the two longitudinal centre axes of the screening bars and extends perpendicularly to the same screening bars and is angled with respect to the conveying direction F.

The joint can be provided in particular with a flexible joint part constructed, for example, on the basis of plastic, such as polyurethane. Via such a joint part and with the sufficient rigidity thereof, the screening bar which is attached movably and in an articulated manner can be positioned by the positioning means in an unaffected manner in a predefined position, for example with a minimum or a predetermined spacing relative to the endless carrier. In particular, the movable screening bar can be attached to the endless carriers directly or indirectly via two end-side film hinges, for example via a screening bar connected fixedly to the endless carriers.

The screening bar that is movable relative to the endless carrier can be used by the positioning means and the articulated connection in order to vary the screening bar spacings. The positioning means can be arranged movably relative to the frame of the screening bar unit, to a machine frame or else fixedly on said screening bar unit and machine frame. The movement of the corresponding screening bar is preferably produced from the movement of the endless carrier relative to the positioning means. In particular, positioning means which, during operation, act simultaneously on the screening bars that are movable relative to the endless carrier are arranged on both sides of a screening bar unit provided with two or more endless carriers.

Flap units according to the invention can be arranged successively or consecutively in the conveying direction of the screening belt, such that the positioning means, which is arranged at least locally along the screening belt and in particular in the screening zone, simultaneously influences a plurality of flap units in terms of the angular positions thereof. As a result of different angular positions on account of different positions of the positioning means, a respectively different spacing arises, as seen in the screening direction, firstly between the fixedly spaced-apart screening bars of a screening bar unit and secondly between the screening bars of a first upstream and a downstream screening bar unit.

The screening direction is in this case the direction of the force of gravity, which acts on the extraneous material such that the latter can drop through between the interspaces formed by the screening bars, provided that the dimensions are correct.

According to a development according to the invention, the positioning means is configured such that it limits the in particular gravity-related pivoting or rotation of the flap units. It is thus located beneath the movable parts of a screening bar unit or of the flap unit and forms a support or a support surface therefor. Thus, an angular position can be defined by the resting of the movable parts of a screening bar unit, said angular position being associated with a particular screening belt pitch. If the positioning means is spaced apart to a sufficiently great extent from the screening bar unit such that the latter is no longer in contact with the positioning means, the screening bar unit is then oriented by gravity. In this position, the spacing in the conveying direction of successive screening bars, i.e. screening bars that follow one another, the pitch, is at a maximum at least in the case of a screening zone extending horizontally with respect to the underlying surface (and with any asymmetries in the weight distribution of a flap unit not being taken into account). In the case of an arrangement of the positioning means extending as closely as possible along the endless carrier, the screening unit can be pivoted only slightly, if at all, and has a horizontal or virtually horizontal orientation extending parallel to the conveying direction F. The screening bar spacings are then minimized.

Advantageously, the positioning means has, in the screening zone, at least one guide surface for the flap units to rest on. Such a guide surface, which extends along the screening belt as per the arrangement of the positioning means, provides a structurally relatively simple possibility of influencing a large number of screening bar units at the same time. As a result of such a guide surface and thus the positioning means being moved towards and away from the screening belt, freedom of movement is defined for the pivotable or rotatable flap units, this freedom of movement resulting in the determination of the adjustment angle of the flap units and thus the screening belt pitch. Advantageously, as seen perpendicularly to the conveying direction, the guide surface is arranged next to and in particular at least partially between the endless carriers. It is then possible for conventional screening belts to be used without changing the installation space width for the screening belt, wherein the positioning means is arranged along the screening zone merely on the inside in the often present air spaces of the screening belt frame and is fixed preferably in a variably positionable manner on the machine frame or screening belt frame. In this way, already existing harvesting machines can thus be retrofitted with the screening belt unit according to the invention.

Preferably, the guide surface, in order to create a selectively variable spacing, i.e. a selectively variable screening belt pitch, may be provided with a profiling, which can be present locally or on the entire guide surface of the positioning element for supporting cleaning purposes. As a result of a profiling, it is possible, during operation, for the spacing of the screening bars or the angular position of the flap units to be influenced, this in turn resulting in brief, pulse-like raising or lowering of the transported mixture. As a result of a shaking movement induced in such a way, a cleaning action can be supported in a simple manner.

At least one portion of the guide surface is preferably configured in such a manner that its spacing from the conveying surface increases or decreases, in particular continuously, in the conveying direction F. The conveying surface is configured here by means of the longitudinal centre axes of screening bars which are arranged immovably relative to the endless carriers. As a result, the screening bar unit can be adapted by the simplest means, such as a sliding rail as positioning means, over the conveying section to the mixture ratio of root crops and extraneous material, which changes by screening-out operations, along the conveying section. The spacing can be particularly preferably varied depending on a pitch angle of the conveying surface. The effect which can thereby be achieved is that, in steeper portions of the conveying strand of the screening belt unit, larger steps or pockets can be formed between consecutive, immovable screening bars or consecutive, movable screening bars by the fact that the movable screening bars are moved further away at least from a respectively adjacent, immovable screening bar. As a result, rolling of the root crops downward counter to the conveying direction can be effectively avoided in steeper portions. By means of the automatic variation in the spacing of the guide surface according to a pitch angle, the steps or pockets can be receded to form more shallowly extending portions of the screening belt unit and can thus produce a screening bar configuration that is optimum for the screening.

It goes without saying that the screening bars can be provided, in particular—but not only—for protecting the harvested material, with a plastics coating, which has damping properties. It is also possible for a plurality of screening bars of a flap unit or screening bar unit to be provided with one and the same covering, such that the spacings of the screening bars of a screening bar unit are reduced to zero.

Generally, a screening bar is understood to be a bar of any cross section that is spanned between the endless carriers. The cross section can be formed in a round, non-round and in particular more flat manner.

In order to variably set or realize a settability even during ongoing operation or during brief retrofitting phases, according to a further configuration according to the invention the positioning means can be assigned at least one adjusting member, via which the spacing of at least one part, guiding the flap unit, of the positioning means with respect to the endless carrier is settable. In particular, in this way, at least the spacing of the guide surface with respect to the endless carrier is varied. This spacing then results in the angular position of the flap unit connected to the endless carrier. Suitable adjusting members are preferably threaded bars for in particular manual adjustment or adjustment controlled via stepper motors. Alternatively or in addition, hydraulically or pneumatically or generally electromotively operated adjusting members can be used. These are actuatable in particular via an evaluation or control device that belongs to the machine controller and in particular is integrated therein.

Preferably, a positioning means is arranged both at the left-hand end and at the right-hand end of the respective screening bar units, as seen in the conveying direction, such that uniform guidance of the movable screening bars is realized. Regardless of a partially integral connection, possibly present at the frame, of the positioning means to a guide of the respective endless carrier, a part of the positioning means that effects guidance of the screening bar units is arranged in a manner spaced apart from the endless carrier.

The positioning means may be configured advantageously in a multipart manner along the screening zone, such that there is as much variability as possible in the spacing apart in particular of the guide surface from the endless carrier. The guide surface can then likewise be configured in a multipart manner and can execute changes in the pitch of the screening belt.

For example, a screening belt unit according to the invention that is provided with flap units can furthermore be used in a rising region of the screening belt by setting a particular angular position of the flap units in order to form conveying pockets in the screening belt, while, in the case of conveying portions extending more horizontally, the emphasis can be placed on the screening function. For this purpose, in the screening belt region having primarily a screening function, other, and in particular also varying, spacings of the guide surface from the endless carrier and thus associated different angular positions of the flap units and screening bar spacings can be set. A screening belt unit according to the invention can thus have different key functions over the course of its screening zone in the upper strand.

In this regard, in the case of a multipart positioning means, the screening belt unit according to the invention then also has in particular a plurality of adjusting means. While the screening bar units according to the invention can have slight changes, brought about for example via slots, in the spacings of the screening bars from one another, it is advantageous, in order to avoid undesired positions and to define precise spacings, for the screening bars of a screening bar unit to have a fixed spacing from one another, apart from any play there may be.

Preferably, at least one of the movable screening bars of the screening belt unit has differently sized spacings in a central position from the upstream or downstream, immovable screening bars. Alternatively, the longitudinal centre axis of the movable screening bar has different spacings from the longitudinal centre axes of the upstream or downstream immovable screening bar. In this refinement, in particular no further screening bars are located in the conveying direction between the movable screening bar and the upstream or downstream immovable screening bar. In the central position, the longitudinal centre axis of the movable screening bar, in particular in the event of a rectilinear course of the belt, is at least substantially arranged in a plane with the longitudinal centre axes of just the immovable screening bars, that is to say in particular that the movable screening bar is located precisely between the immovable screening bars. The effect achieved by the different spacings from the adjacent screening bars in the central position is that the movable screening bar in a further position has identical spacings from the immovable screening bars. This configuration of the screening belt unit is advantageous in particular if the movable screening bars are predominantly located outside the central position during operation. The screening bars over most of the operation therefore have a uniform spacing from one another that is optimum, for example, for a screening function. In addition, the further advantages of the invention that are described above and below can be achieved by the adjustability, here in particular after sufficient screening through the gap between individual screening bars.

According to a further advantageous configuration of the invention, a screening bar of each screening bar unit is fixed to the endless carriers and forms a part of two joints for attaching the flap unit. As a result of the fixing of the screening bar, a pivot joint or rotary joint can be formed in a simple manner, which allows, via the pivotable or rotatable joint parts, a movable screening bar arranged parallel to the fixed screening bar. Appropriately, the screening bar unit has, towards both external endless carriers, a rotary or pivot joint. The screening bar fixed to the endless carrier then forms the axis of rotation of the flap unit. Alternatively, it is possible for, for example, two screening bars that pivotably form the flap unit to be mounted on one another and, via a bent connection that does not form a screening bar, in a pivot bearing or rotary bearing of the respective endless carrier.

In particular, the positioning means is configured to be at least partially strip-shaped such that the guide surface can be, for example, part of a guide rail which can be mounted, and in particular retrorespectively added, as a structurally relatively simple component to a frame of the screening belt or to a machine frame during installation of a screening belt unit according to the invention into a harvesting device. Such a guide rail can be, for example, part of an angular profile.

In order to minimize wear between the pivotable screening bar unit part and the guide surface, the positioning means can also be configured at least partially in a concurrently running manner. In such a structurally more complicated case, the speed of revolution of the positioning means, which can also be configured for example in a belt-like manner, would be matched to the speed of revolution of the screening belt. The positioning means would then likewise be configured again with a variable spacing from the screening belt via corresponding positioning means.

Alternatively or additionally in the case of one or more multipart positioning means, said one or more multipart positioning means can comprise a roller which is likewise mounted in particular on a frame of the screening belt or of the screening belt unit or on a machine frame. Such a roller is provided in particular with an axis of rotation which is oriented parallel to the substantial longitudinal extent of the screening bars. The roller can be arranged in such a manner that it in each case acts on the movable screening bars in the end regions thereof. For example, the roller, in an attachment to a frame of the screening belt unit, can be positioned directly on the inside of the endless carriers and can run either directly along the screening bars or the parts connecting screening bars arranged movably and fixedly on the endless carrier. It is also conceivable to arrange a roller as a positioning means, for example in the centre between two endless carriers. Such a roller or such a positioning means can lead during the use of screening bars arranged fixedly on the endless carrier to the entire screening belt being raised when a roller travels over it. If all of the screening bars are arranged movably on the endless carrier, for example via film hinges, the belt, for example, would not be raised whereas a wave-like movement of the screening bars is induced by the roller. In a corresponding manner, shaking movements can be produced by a multiplicity of rollers in the upper strand, this being associated with a variation in the screening bar spacings.

The roller in the upper strand is preferably designed for pushing up at least the screening bars that are fixed so as to be movable relative to the endless carriers. In this case, the screening bars that are fixed so as to be movable relative to the endless carriers lie in the upper strand on the endless carriers and are then pushed upwards by a correspondingly prominent roller. If, therefore, no positioning means are present, in such an exemplary embodiment the screening bars correspondingly have a minimum spacing from the fixed screening bars. Such a positioning can be secured, for example, by the use of correspondingly stiff but nevertheless elastic joint parts such that the screening bars which are correspondingly pivotable only under the action of force are then positioned comparatively fixedly.

The rigidity of the joints would then be configured in such a manner that, during normal operation of the screening belt unit, the vibrations occurring during the operation lead to only minimum changes, if any at all, in the relative position of the screening bars that are arranged movably on the endless carriers.

The use of a series or rollers along the upper strand of a screening belt unit permits the retrofitting of existing machines and also the simple re-equipping of new units.

Preferably, at least 25% of the screening bars are configured to be variable in position relative to the endless carrier, such that a screening belt has a variable screening pitch along large parts of its total length. More preferably, a screening belt unit according to the invention is furthermore provided with a screening belt that is provided at least to an extent of 50% with screening bars formed in a variable position with respect to the endless carrier. In this way, it is possible, for example, for every second screening bar to be formed in a stationary manner, while a flap unit is arranged on each stationary screening bar with a screening bar that is at a fixed spacing, but is movable in a pivotable manner about the stationary screening bar. Configurations according to the invention of the screening belt unit can preferably design up to 3 out of 4, i.e. 75% of the screening bars so as to be variable in position, such that advantageous configurations of the flap unit with two screening bars that are pivotable about a stationary screening bar or with three pivotable screening bars can be used.

The preferred embodiments of the invention are provided with flap units that are at least to a certain extent freely pivotable or rotatable about an axis of rotation that is in a fixed position with respect to the endless carriers, or fastening when flexible joint parts are used, and are in particular the stationary screening bars. In order to avoid undesired turning down of the flap units that are freely pivotable between stationary screening bars in the region of deflections, it is possible, precisely in these regions, to provide one or more guide units, which, in addition to the positioning means and in particular as seen in a transverse direction, are arranged outside the region delimited by the endless carrier. Preferably, these are already known haulm feed-in rollers, which, in the relevant region located at the front in the direction of travel, prevent any flap units that pivot on account of centrifugal force from turning down in an undesired manner.

Preferably, a guide surface of the positioning means and an outer surface, provided for resting thereon, of a flap unit are formed in parallel, in order to bring about good guidance and a cleaning action on regions of the positioning means that are soiled by extraneous material during operation.

The object set at the beginning is likewise achieved by a flap unit, which comprises a screening bar and has at least one joint part configured to be fixed releasably to a further screening bar of a screening belt unit as described above or below, wherein the joint part or the screening bar of the flap unit has an outer surface configured to rest on a positioning means. The joint part can be part of a film hinge or of a pivot joint. While the positioning means has preferably an outer surface, provided with a plastics coating, and a guide surface, the flap unit can to this end advantageously have a surface that is formed parallel thereto in the different resting positions and ensures guidance that is as good as possible. Furthermore, the widths of the guide surface are advantageously coordinated with the width of the supporting surfaces of the flap unit such that they differ in width only by a few centimetres (<10 centimetres). In this way, only little extraneous material can be deposited on the guide surfaces of a positioning means, and the guide surfaces are at the same time cleaned by the circumferentially resting outer surfaces of the flap unit in the upper strand during operation.

Advantageously, the joint part is configured in at least two parts and to receive the further screening bar of the screening belt unit, such that it is readily possible to exchange individual damaged or worn flap units. In particular, the joint part is then part of a rotary joint.

The joint parts present for mounting on a screening bar are preferably in the form of joint housings and can either be provided integrally with the transverse or screening bar that is positionable in a variable position or have corresponding receiving regions for conventional screening bars.

The flap unit preferably has a shoulder element which has the outer surface configured for resting on the positioning means. The shoulder element can be defined on the basis of a plane in which a longitudinal centre axis of the movable screening bar of the flap unit and a longitudinal centre axis of a receptacle of the flap unit are arranged, said receptacle being configured for fixing to a further screening bar which is immovable relative to the endless carriers. In the mounted state of the flap unit, the longitudinal centre axis of the receptacle coincides with the longitudinal centre axis of the further immovable screening bar. The shoulder element has an extent transversely to said plane that is at least 25%, preferably 50%, particularly preferably 100%, of the spacing of the longitudinal centre axes from each other. The shoulder element is in particular integral with the joint part or a part thereof. The outer surface is arranged in particular at least partially between two orthogonal planes which are orthogonal to the above-described plane and each contain one of the above-described longitudinal centre axes.

By means of the shoulder element, the movable screening bars can be raised in a simple manner into a position in which they are at least partially arranged above the immovable screening bars or the conveying surface. By means of the shoulder element projecting downward in particular from the conveying surface, for this setting no positioning means engaging in the space between two immovable screening bars is required. On the contrary, the movable screening bars and the shoulder element can then form previously described pockets if the positioning means, for example a sliding rail, is still significantly spaced apart from the immovable screening bars and there is no risk of damage. At the same time, the shoulder elements permit setting of the movable screening bars below the conveying surface formed by the immovable screening bars. The shoulder elements therefore permit a more extensive settability of the flap unit or of the screening belt unit, thus ensuring a simple and reliable design.

The movable screening bar preferably has a profile which is bent from the joint part. The movable screening bar has a central, rectilinearly running centre portion, the centre portion longitudinal centre axis of which, in a side view, has a spacing C from the joint part. The spacing C is in particular at least 10%, preferably at least 25%, particularly preferably at least 50%, of the spacing D of the centre portion longitudinal centre axis from the longitudinal centre axis of the receptacle or of the immovable screening bar. In this configuration, the movable screening bar projects upwards in particular from the at least one joint part. Lateral portions running at an angle produce a connection of the centre portion to the joint part. Alternatively or additionally to the previously described variant with the shoulder element, this configuration affords the possibility of positioning at least the central portion of the movable screening bar above the conveying surface without the positioning means having to engage in the space between the surrounding, immovable screening bars. In particular, for this purpose, the at least one joint part can rest on the positioning means. The outer surface of the joint part for resting on the positioning means is located in particular on a part of the joint part that projects over the starting point of the movable screening bar from the receptacle or the immovable screening bar. As a result, the setting of the pivotable flap unit can be transmitted by the positioning means and the function of the screening belt unit thereby optimized.

In addition, the object set at the beginning is also achieved by a screening belt having at least two endless carriers which are preferably configured as carrier belts or carrier chains and between which screening bars are arranged in a direction transversely to the conveying direction, wherein a plurality of the flap units described above or below is present. In particular, such a screening belt, which likewise has the respective advantages described above and below, is completely formed by screening bar units comprising a corresponding flap unit.

The screening belt or the screening belt unit, in particular the joint part thereof, is preferably configured in such a manner that the movable screening bar is movable up and/or down from the above-described central position at least partially orthogonally to the conveying surface. The movable screening bar or the longitudinal centre axis thereof is movable away from the conveying surface by at least 10 mm, preferably by at least 20 mm, particularly preferably by at least 30 mm. Alternatively or additionally thereto, the movable screening bar or the flap unit or screening bar unit is pivotable, at least primarily, up and/or down about an angle of at least 30°, preferably of at least 60°, particularly preferably of at least 90° relative to the conveying surface. In particular, the positioning means is configured for such a movement of the movable screening bar, preferably out of the central position. The movable screening bar or the flap unit is preferably mounted rotatably about >360°, in particular about the longitudinal centre axis of the movable screening bar. This extent of movability enables the previously described functions of the invention to be achieved particularly extensively. In particular, particularly large slopes can thereby be overcome with the root crops and the screening efficiency can be set particularly extensively.

In a preferred configuration of the invention, the joint part is configured in such a manner that a supporting axis in the central position is pivoted relative to the conveying direction. In particular, the supporting axis in the central position is arranged so as to be pivotable relative to the conveying direction about an angle of at least 45°, preferably about at least 70°, particularly preferably about at least 80°. The supporting axis is arranged orthogonally to the longitudinal centre axis of the movable screening bar. In addition, the supporting axis intersects the longitudinal centre axis of the movable screening bar and a central position contact region of the outer surface of the joint part. The joint part rests with the central position contact region on the positioning means in the central position. The supporting axis here is an imaginary geometrical axis. By means of this arrangement of the central position contact region or of the outer surface relative to the longitudinal centre axis of the movable screening bar, the contact point of positioning means and screening bar unit or flap unit is spaced apart to a particularly small extent from the movable screening bar. Movements of the movable screening bar can thereby be initiated directly and the loading, in particular a compressive force, in particular of the joint part is reduced to a minimum extent and a compact structural form of the flap unit or screening bar unit is achieved.

Finally, the object is likewise also achieved by a harvesting machine comprising a screening belt unit as described above or below. This machine has the advantages of the screening belt unit that are described above and below. It goes without saying that this harvesting machine has the means that are necessary for operation of the screening belt unit according to the invention, for example guide rollers or guide pulleys, drive means, frames or other supporting parts. In particular, the positioning means is fixed to the frame and can act on the movable screening bars via at least one correspondingly supported adjusting member.

The harvesting machine preferably has an inclination sensor which is assigned to the screening belt unit or is included by the latter. In particular, the harvesting machine also has an evaluation and control device which is connected to the inclination sensor. The inclination sensor and/or the evaluation or control device is coupled to at least one adjusting member in such a manner that, as the inclination of the harvesting machine increases, an automatic adjustment of the positioning means can be initiated. In particular, an inclination of the harvesting machine or of the screening belt unit about a pivot axis extending through the vehicle axis is measured by the inclination sensor. By means of the automatic adjustment, the design of previously described steps or pockets of the screening belt unit can be adapted to avoid root crops rolling back counter to the conveying direction, in so far as, in the event of an inclination at the steps or pockets that increases a local slope of the screening belt unit, in particular a pivoting of the flap units or screening belt units relative to the central position is increased. In the event of an opposite inclination, the automatic adjustment causes the steps or pockets to correspondingly recede and thereby optimize the screening function of the screening belt unit.

The ground inclination can additionally or alternatively be determined via one or more other sensors, for example on the basis of a GPS sensor or similar location sensor in conjunction with a ground map stored locally in the evaluation or control device or externally on a server. The control and evaluation device comprises conventional EDP means which are used in harvesting machines. It is preferably integrated in the machine controller.

The harvesting machine comprises in particular a screening belt having a pitch which varies along its conveying strand, in particular along the conveying surface. In particular, the pitch decreases continuously or in a stepped manner in the conveying direction. The pitch of the conveying strand or of the conveying surface preferably varies within a range of between 0° and 60°, particularly preferably within a range of between 15° and 45°. The conveying surface preferably has a plurality of, in particular at least three, preferably four, flat conveying surface portions. The conveying surface portion which is rearmost in the conveying direction and in particular is situated lowest and onto which the root crops are fed during the operation in particular has a pitch of substantially 42°. The conveying surface portion which is frontmost in the conveying direction in particular has a pitch of substantially 18°. By means of this design of the screening belt or of the harvesting machine, the previously described advantages of the screening belt unit or of the screening belt can be used particularly extensively.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 23: shows the subject matter according to FIG. 20 in a further detailed illustration.

DETAILED DESCRIPTION OF THE DRAWINGS

Individual technical features of the exemplary embodiments described below can also be combined to form subject matter according to the invention in combination with above-described exemplary embodiments and the features of the independent claims and any further claims. Where appropriate, elements that are functionally equivalent at least in parts are provided with identical reference signs.

Figure 1:
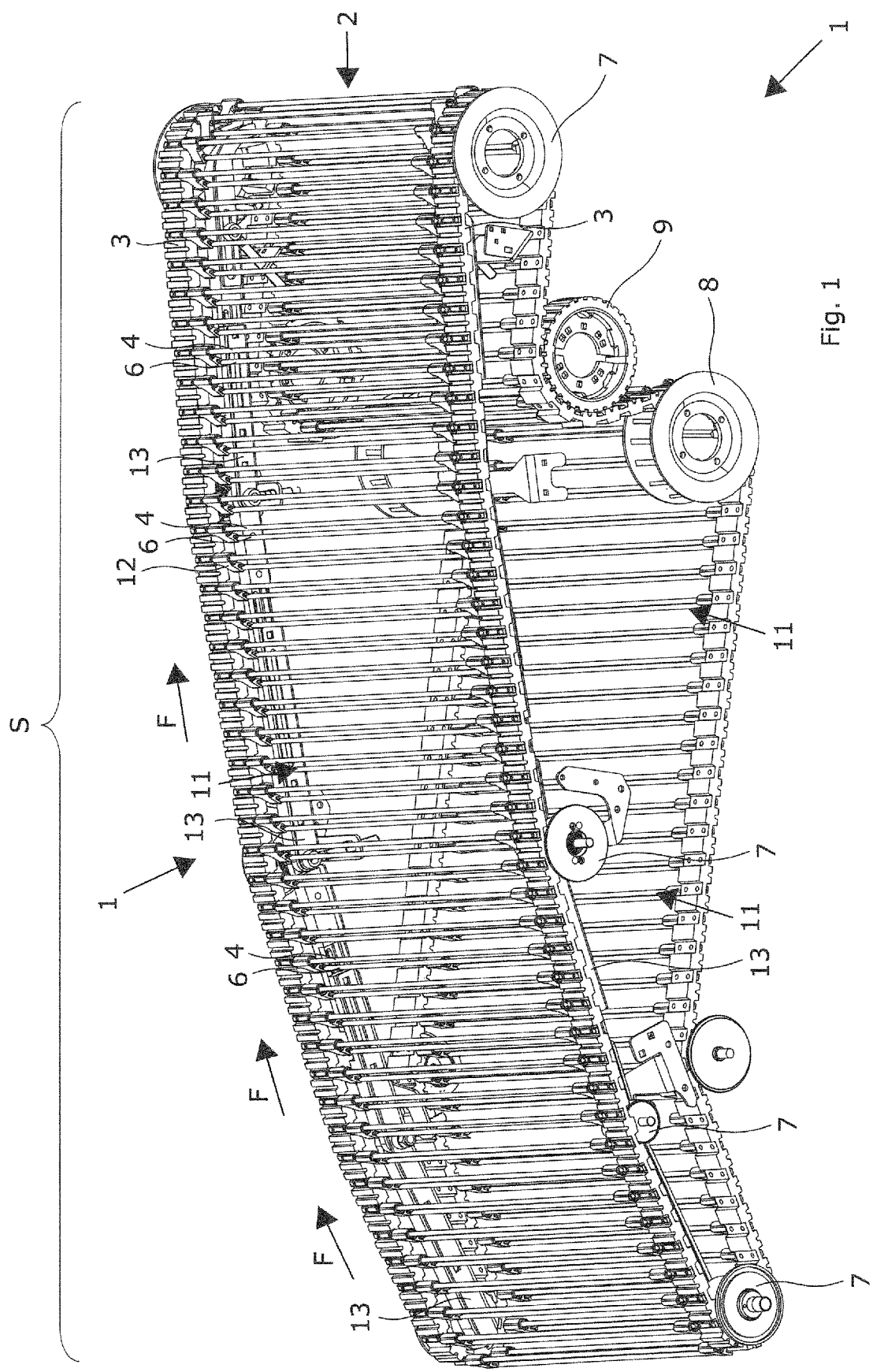
FIG. 1: shows subject matter according to the invention in a perspective illustration.

A screening belt unit 1 according to the invention comprises, according to FIG. 1, a screening belt 2, which is provided to screen extraneous material out of a mixture of harvested material and extraneous material. The screening belt 2 has two endless carriers 3, in the form of carrier belts, between which screening bars 4 and 6 are arranged in a direction transversely to the conveying direction. With respect to a horizontal, not indicated, the conveying direction F has different pitches over the course of a screening zone S formed by the upper strand of the screening belt 2. These pitches result from the positioning of deflection rollers or deflection pulleys 7, which may partially be in the form of drive pulleys. A tension pulley 8 tensions the screening belt 2 against a drive pulley 9, such that, depending on the set pitch of the screening belt, there is sufficient contact with the drive roller 9 in the individual screening belt zones.

Individual screening belts 4 and 6, which will be described in more detail below, form screening bar units 11 (cf. FIG. 6), which have a screening bar 4 fixed to the screening belt 2 and a screening bar 6, fixed thereto in an articulated manner, including an associated joint part 12.

The screening bars 6 are fixed in a movable manner relative to the endless carriers 3 via the rotary or pivot joints formed between and by the screening bars 4. Along the screening belt 2, a plurality of positioning means 13 are arranged both on the left-hand side in the conveying direction and on the right-hand side in the conveying direction, said positioning means 13 acting on the movable screening bars 6 in such a manner that, in the screening zone, a spacing A (cf. FIGS. 9 to 11), as seen in the screening direction R, is defined and can be set in a variable manner by adjusting members. In particular, the spacing A as a spacing of screening bars following one another in the conveying direction can vary along the screening zone length in the conveying direction F.

Figure 2:
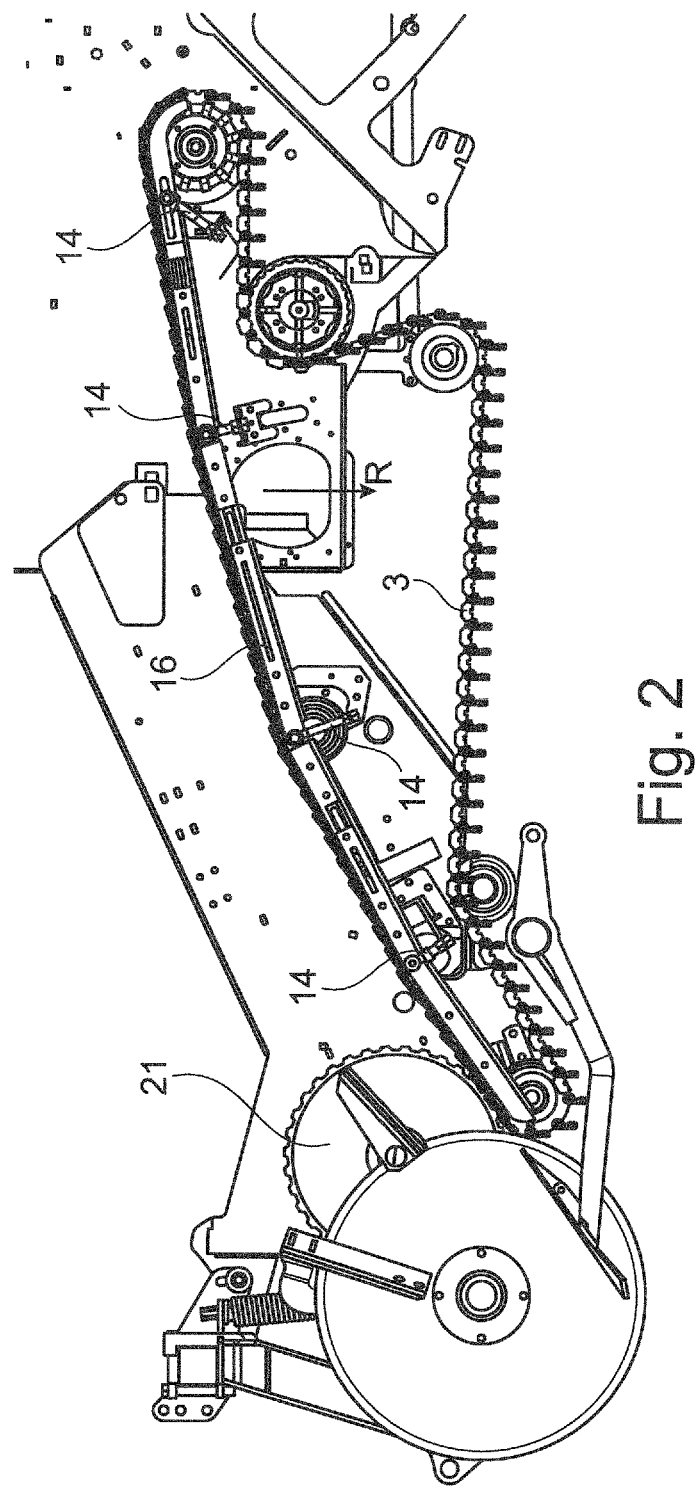
FIG. 2: shows a partial view of further subject matter according to the invention in a side illustration.
Figure 3:
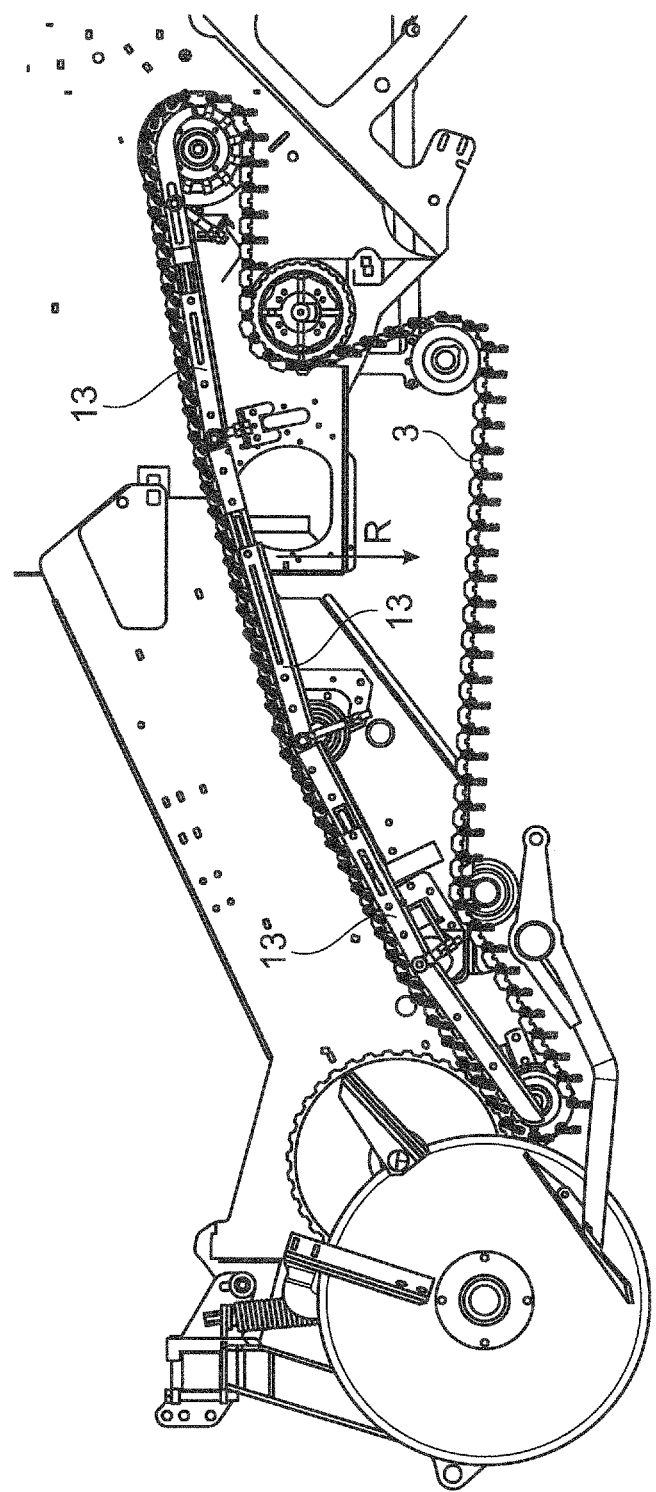
FIG. 3: shows the subject matter according to FIG. 2 in a further operating position.
Figure 4:
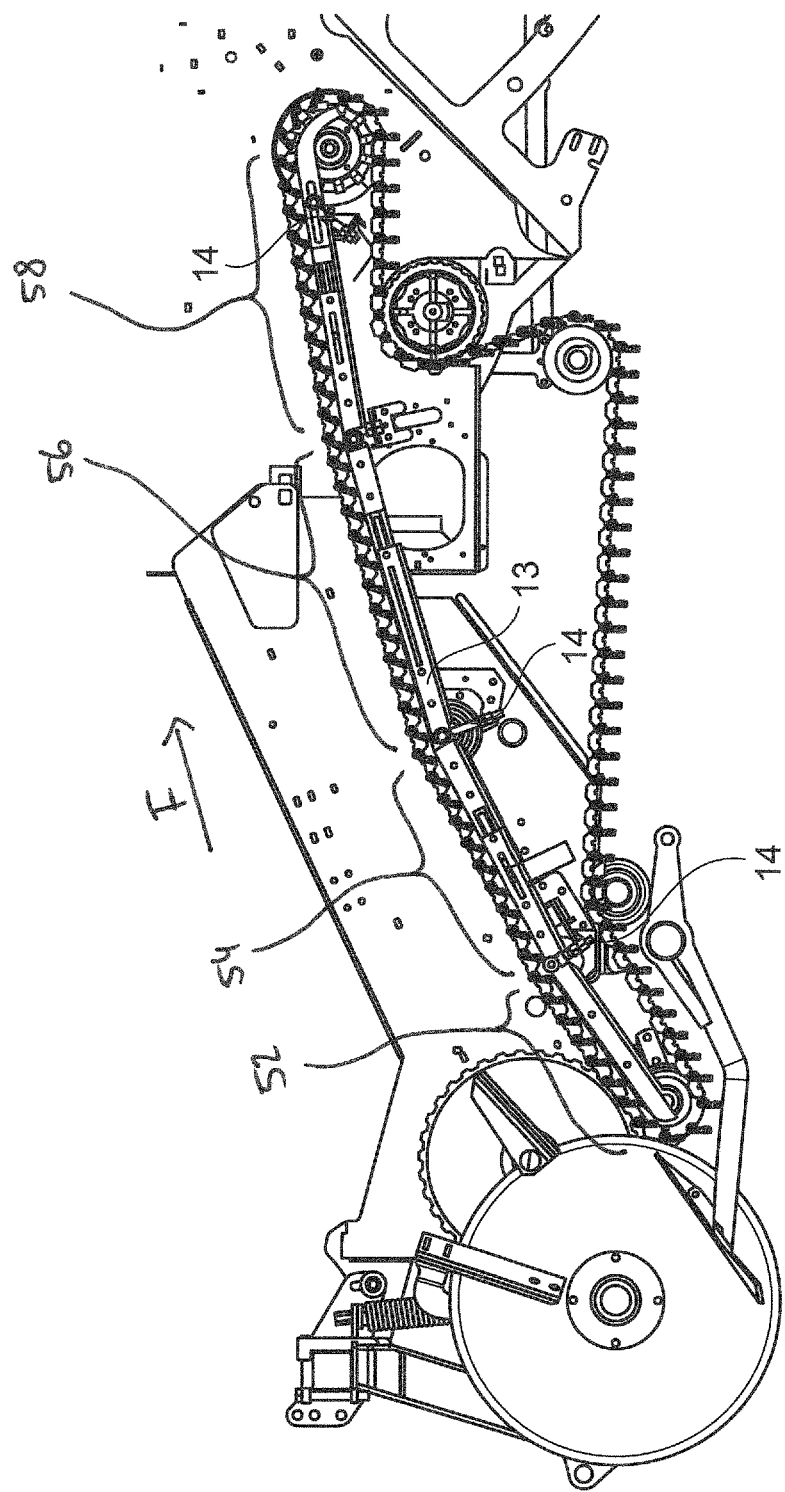
FIG. 4: shows the subject matter according to FIG. 2 in a further operating position.

The positioning means 13 is configured as a guide rail and in a multipart manner, such that, analogously to the individual pitch portions of the screening belt 2, individual portions of guide rails 13 result. With a plurality of associated adjusting members 14 (FIG. 2), the individual portions or parts of the positioning element 13 are able to be moved into the desired relative position with respect to the endless carrier 3. In order, in the case of different pitches of the screening belt in the course of the screening zone S, to be able to make the necessary adaptations, the multipart positioning element 13 is provided with a series of sliding connections that are movable by means of slots. The individual parts of the positioning element are thus guided one inside another and as a result can be moved towards and away from one another, in order for it to be possible to design the overall length of the positioning element 13 in the upper strand and the corresponding sorting zone S in a variable manner. In FIGS. 2 to 4, conventional parts of a harvesting machine according to the invention are furthermore apparent.

The screening belt 2 together with the upper conveying strand forms a conveying surface 40 which has four conveying surface portions 52, 54, 56, 58 adjoining one another in the conveying direction (cf. FIG. 4). The first conveying surface portion 52 in the conveying direction in particular has a pitch of 42° relative to a horizontal, and the final conveying surface portion 58 in the conveying direction in particular has a pitch of 18° relative to the horizontal.

FIGS. 2, 3 and 4 and 9, 10 and 11 illustrate the different screening belt parts and spacings A on account of different relative positions of the positioning element 13 or of parts of the positioning element 13 with respect to the endless carrier 3. As a result of the spacing apart of the positioning elements 13, arranged at least partially between the endless carriers 3 in a top view, from the endless carrier 3, the individual flap units of the screening bar units can take up a different angular position relative to the longitudinal extent of the endless carrier 3 or to the respective conveying direction. As a result, the spacing A of mutually successive screening bars 4, 6 of different screening bar units changes.

Figure 11:
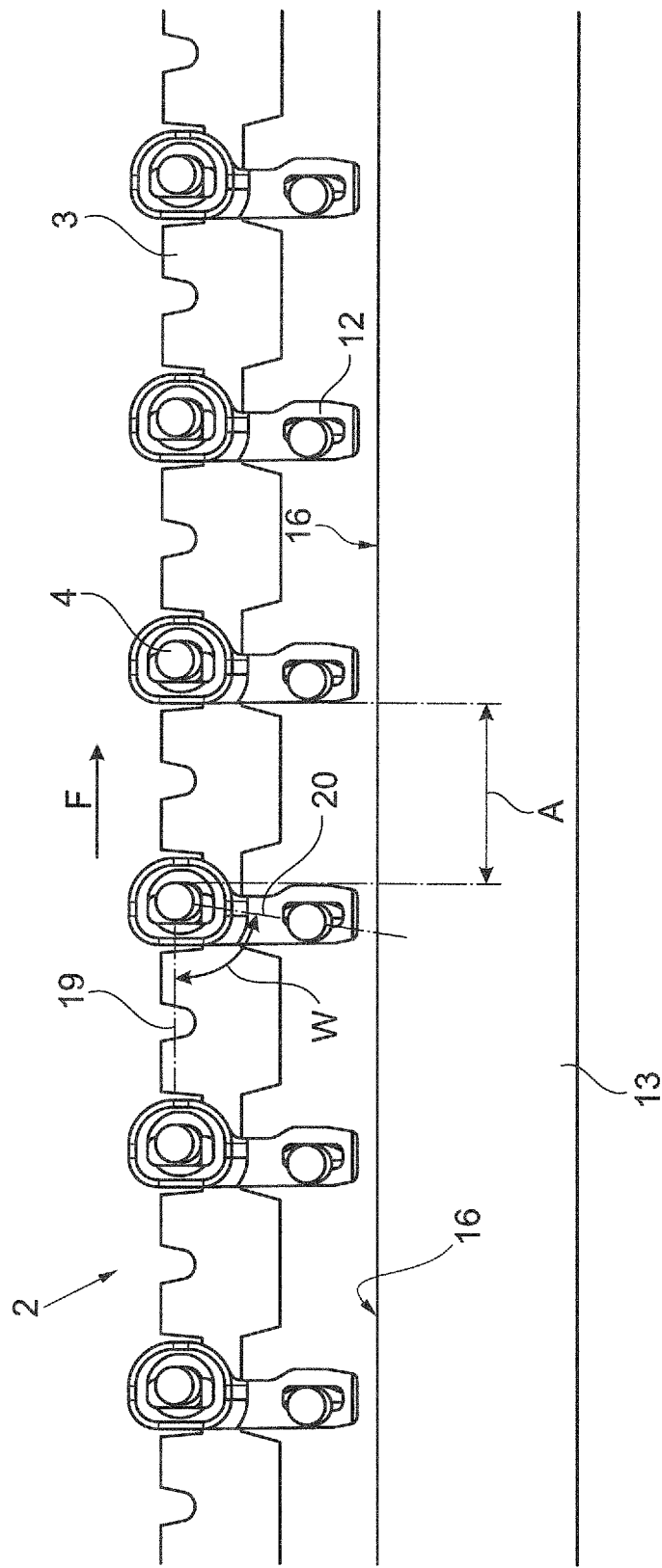
FIG. 11: shows the subject matter according to FIG. 9 in a further operating position.

The positioning means 13 arranged to the left and right on the inside of the endless carriers 3 along the screening belt 2 limit the gravity-related pivoting or rotation of the movable parts of the screening bar units 11 or of the flap units until the opening, as described above, is at a maximum, when the screening belt 2 extends horizontally, on account of a lack of contact with the support (FIG. 11). In order to limit the gravity-related pivoting or rotation of the flap units, the positioning means 13 is provided in the screening zone with a guide surface 16, on which, in the illustration in FIG. 5, the undersides, not shown in more detail, of the joint parts 12 of the flap units, comprising screening bars 6 and the joint part 12, rest. In order to reduce friction with the undersides of the flap units, the surface 16 is provided with a plastics coating. During operation of the screening belt unit according to the invention, as a result of the flap units running or sliding along the guide surface, the latter is cleaned of extraneous material dropping down from the upper strand.

Figure 8:
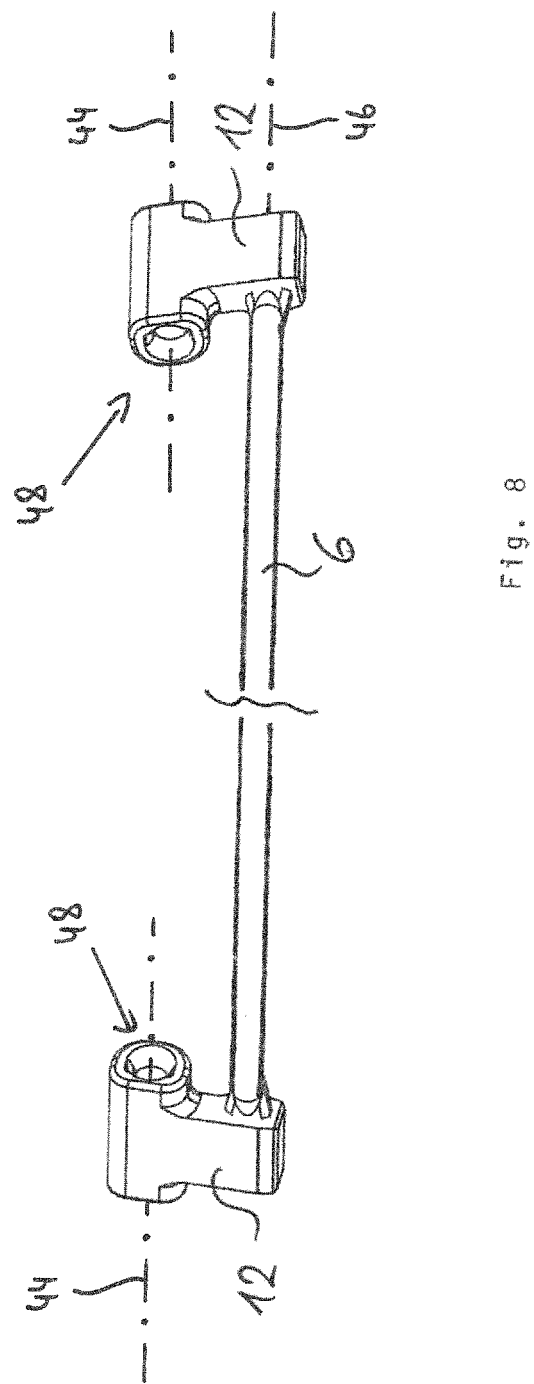
FIG. 8: shows a further subject matter according to the invention in a broken, slightly perspective illustration.

The flap units according to the invention can, according to FIG. 8, have at both ends joint parts 12, which are connected by the screening bar 6, illustrated in a broken manner. The screening bar 6 extends along its longitudinal centre axis 46. The joint part 12 has a receptacle 48 for a further screening bar 4 which is arranged immovably with respect to the endless carriers 3 of a screening belt. The receptacle has a longitudinal centre axis 44 which extends parallel to the longitudinal centre axis 46 and, in the mounted state of the flap unit, corresponds to the longitudinal centre axis 44 of the further screening bar 4 of a screening bar unit 11 formed from the flap unit and the same screening bar 4. The longitudinal centre axis 44 coincides here in particular with the pivot axis of the screening bar unit 11.

Figure 5:
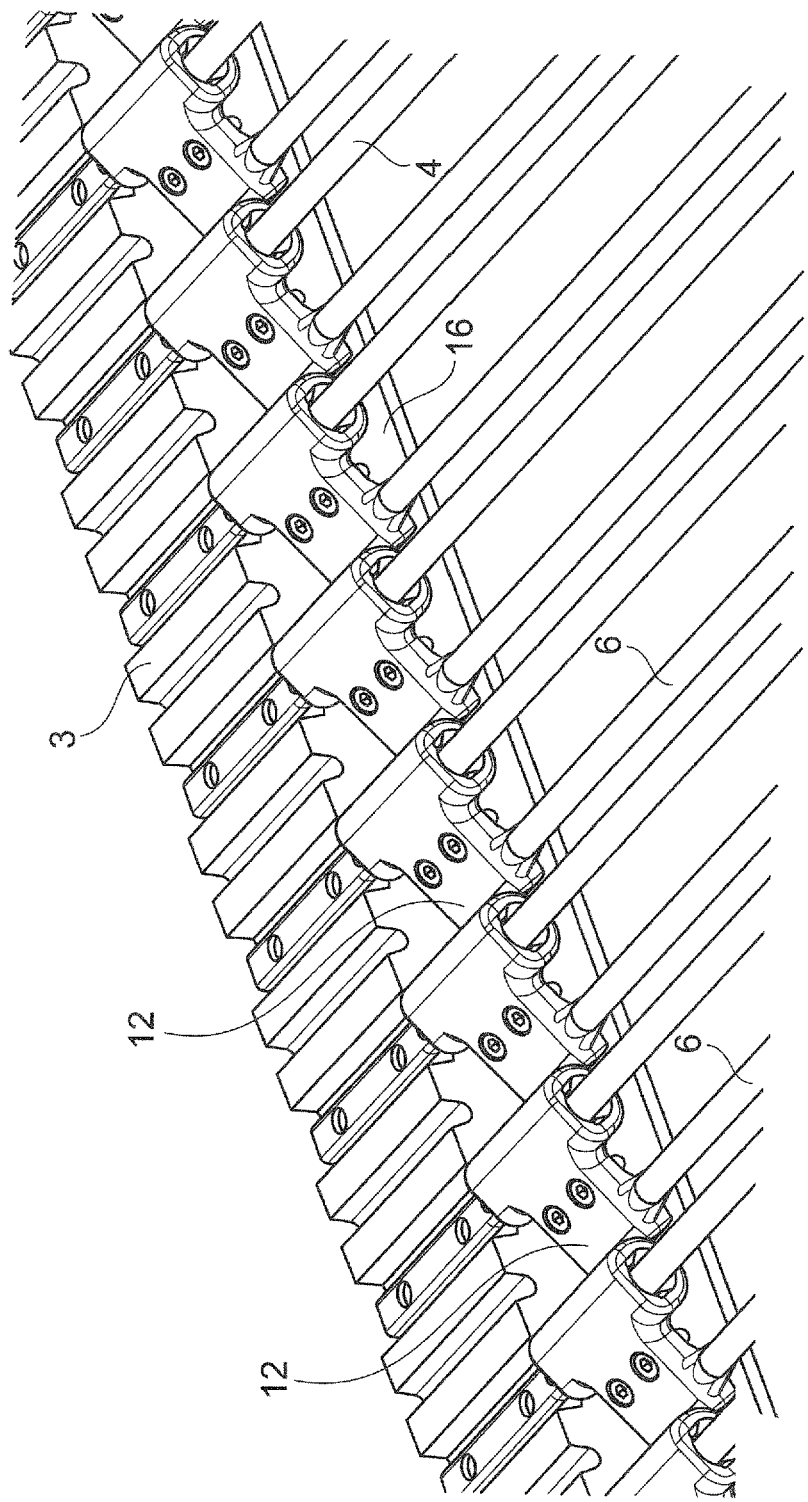
FIG. 5: shows the subject matter according to FIG. 3 in a detailed illustration.
Figure 6:
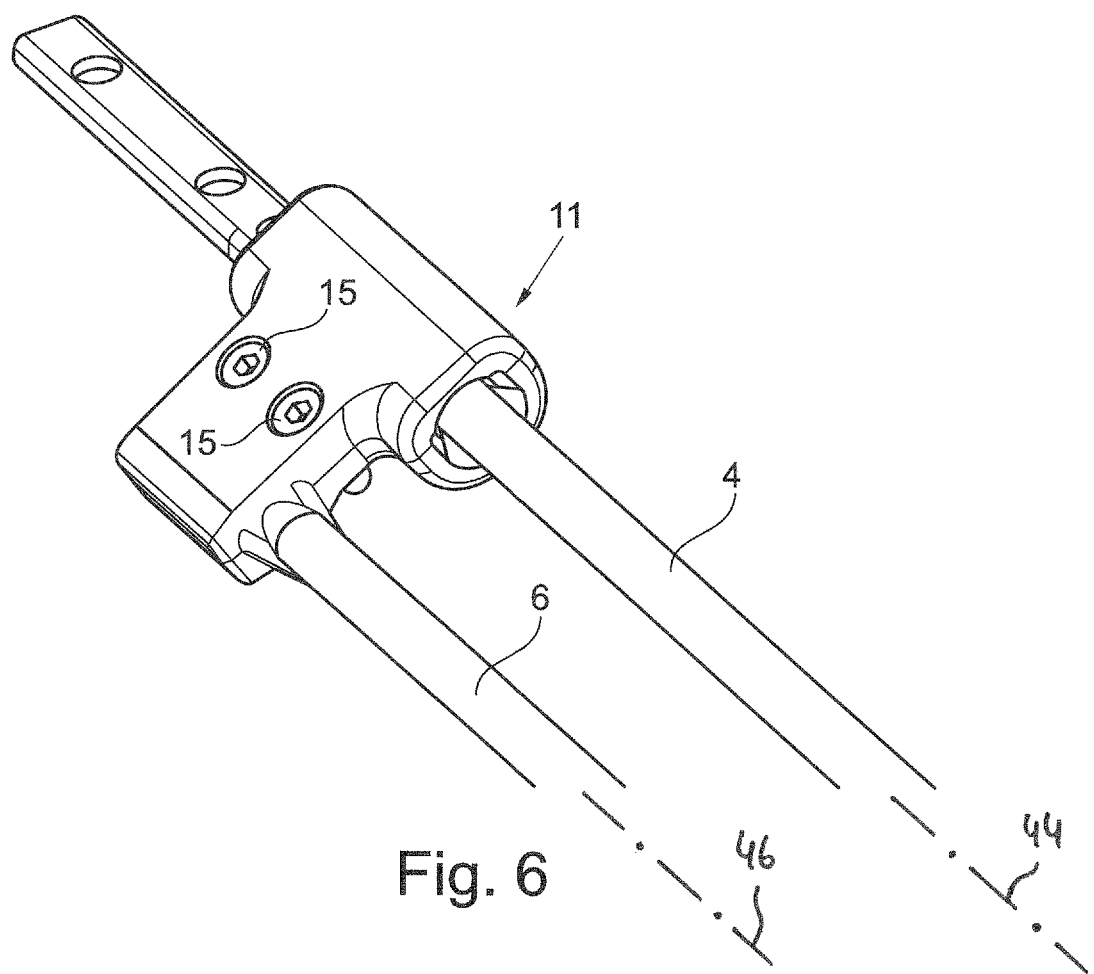
FIG. 6: shows a detail of a device according to the invention.
Figure 7:
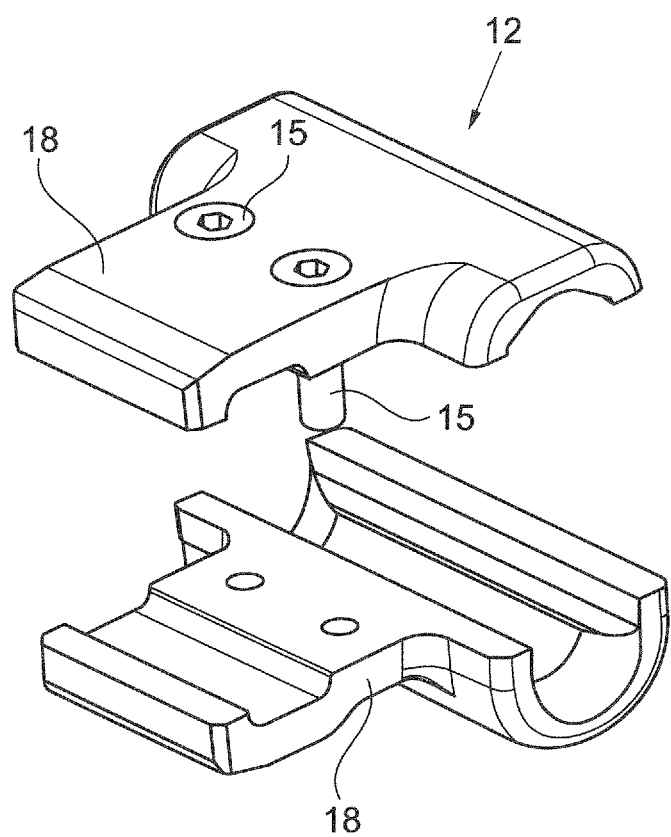
FIG. 7: shows a further detail of a device according to the invention.

The screening bars 4 of a respective screening bar unit 11 are fixed to the endless carrier, and therefore the screening bar 6 is fixed via the joint formed between screening bar 4 and screening bar 6 so as to be variable in position with respect to the endless carrier 3 (cf. FIGS. 5 and 6). For maintenance purposes, a joint part 12 is formed preferably with two housing halves 18 (FIG. 7), which are connected together via fastening means 15. A defective or damaged or worn flap unit can be replaced accordingly quickly.

Figure 9:
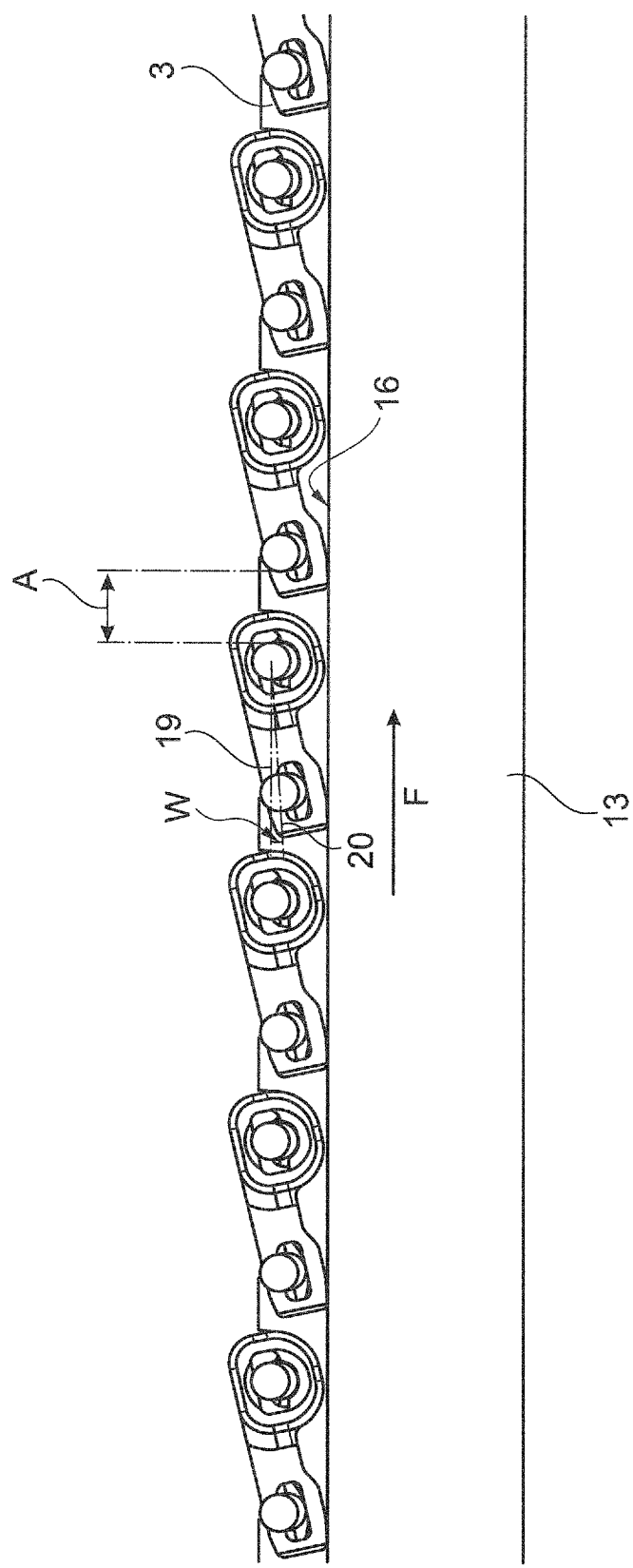
FIG. 9: shows a detailed view of further subject matter according to the invention in a detailed view.
Figure 10:
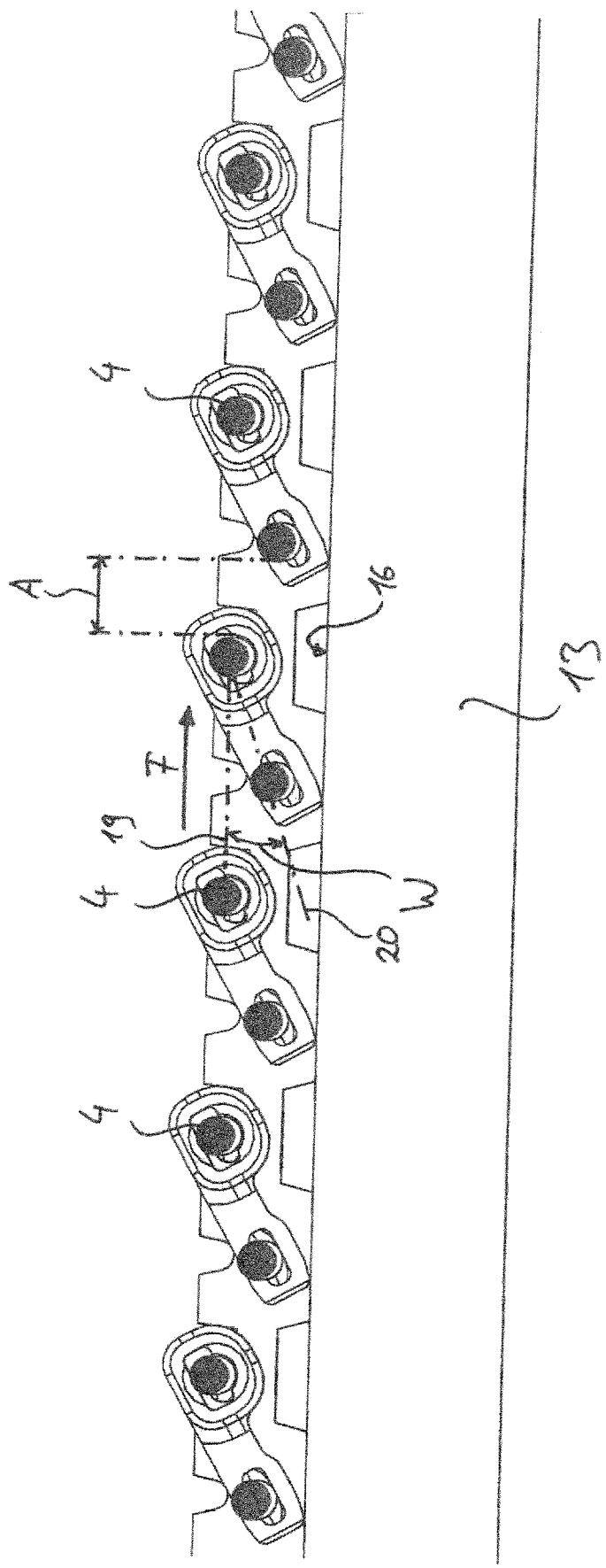
FIG. 10: shows the subject matter according to FIG. 9 in a further operating position.

The angular position of the flap unit or of the screening bar unit is, as shown in FIGS. 9, 10 and 11, delimited in the screening zone S by the spacing of the positioning means 13 and in particular the guide surface 16 thereof from the screening belt carrier 3. In the comparatively close position according to FIG. 9, an angle W between a straight line 19 formed parallel to the conveying direction F and thus to the endless carrier 3, and a straight line 20 formed by the longitudinal extent of a flap unit is virtually 0 (FIG. 9). At an angle W of 0, the movable screening bar is in a central position. As a result of the spacing apart of the positioning means 13 from the endless carrier or the axis of rotation of the stationary screening bars 4, the flap units can open under gravity and optionally loaded by mixture to be screened to a larger angle W and continue to rest on the guide surface 16 (FIG. 10). The greater spacing apart for the positioning means 13 from the axis of rotation of the respective stationary screening bar of a respective flap unit has the result, in the horizontal orientation, illustrated in FIG. 11, of the screening belt 2, that the joint parts 12 no longer rest on the guide surface 16 and the flap parts are pivoted open to a maximum. Depending on the symmetry of the flap unit, the angle W taken up for this purpose is virtually 90°, but at least preferably between 80° and 100°. In particular, the spacing of the positioning means 13 depends on a local pitch 41 of the conveying surface 40 (in which the straight line 19 lies). In order to avoid gravity-related overturning of the flap units in the region of the deflection of the endless carriers 3 or of the screening belt 2, a roller that is conventionally used as a guide unit 21 in the form of a haulm feed-in roller and is preferably formed in a wider manner than the endless carrier may be present in the deflection region (FIG. 2). The angle W can in particular assume angles of at least 60° both with a positive and with a negative sign. In addition, the movable screening bar 6 or the longitudinal centre axis 46 thereof can be situated up and down away from the conveying surface 40 in particular by at least 10 mm, preferably by at least 20 mm, particularly preferably by at least 30 mm.

Figure 12:
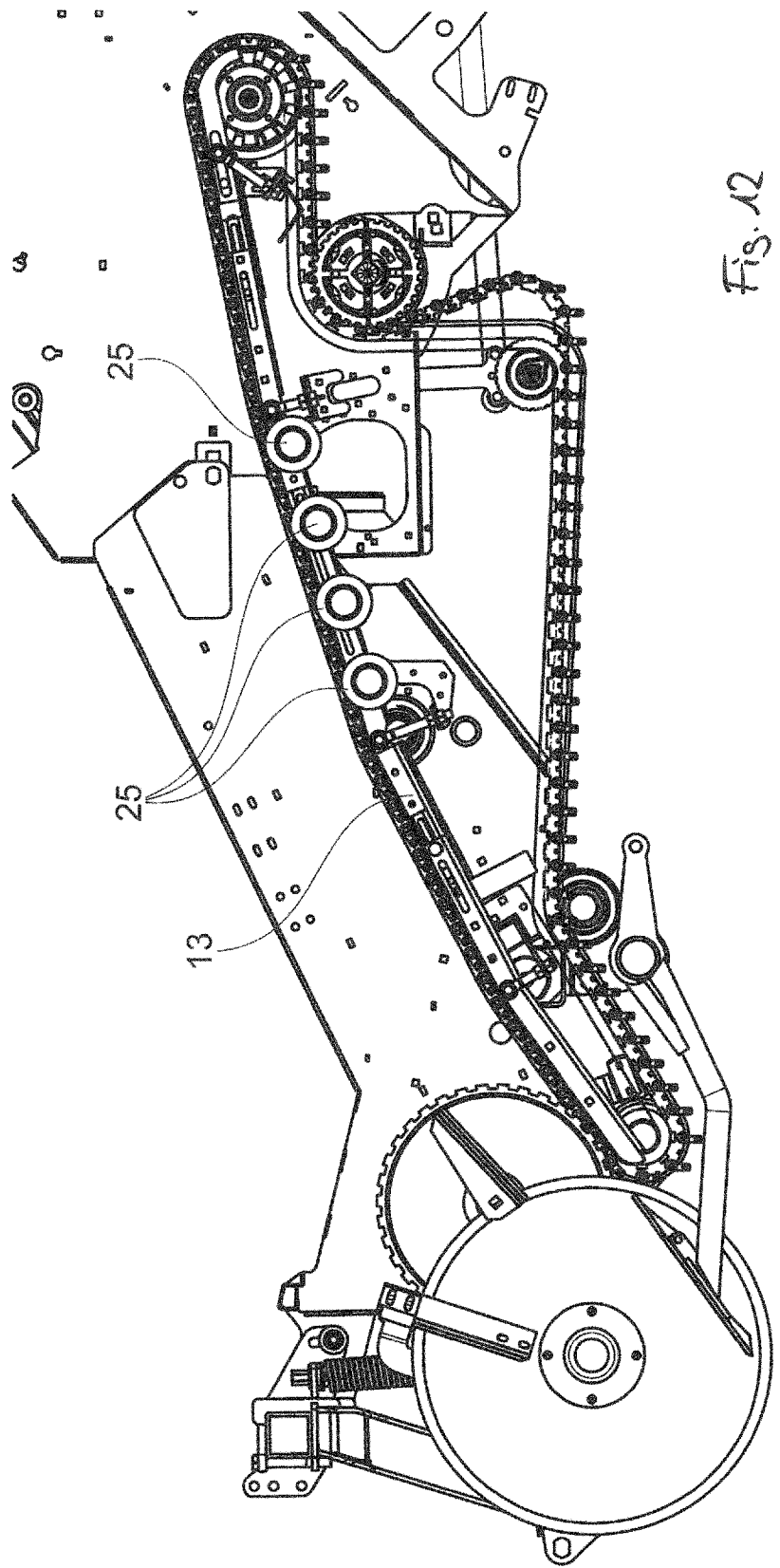
FIG. 12: shows a partial view of further subject matter according to the invention in a side illustration.

FIG. 12 shows a further variant according to the invention of a screening belt unit, in which guide rails 13 may be present, but are positioned fixedly. In addition, there are rollers 25, the axis of rotation of which runs parallel to the screening bars. The rollers have an outside diameter which is dimensioned in such a manner that, in the present example, a maximum of two screening bar units lying next to each other are detected. Owing to the positioning and arrangement of the roller on the frame of the screening belt unit or on the machine frame, the outer surface, which serves as a guide and resting surface for the screening bars, is above the surrounding guides for the endless carrier with respect to a direction vertically to the conveying direction. By this means, the screening bar units entering into contact with the outer surface are partially also raised with the endless carrier fastened thereon. This gives rise to a shaking movement which leads to a greater screening efficiency. The rollers can be exchanged with respect to their diameter and the fixing of one side such that only individual screening bar units or else only the movable screening bars of a screening bar unit are raised.

Figure 13:
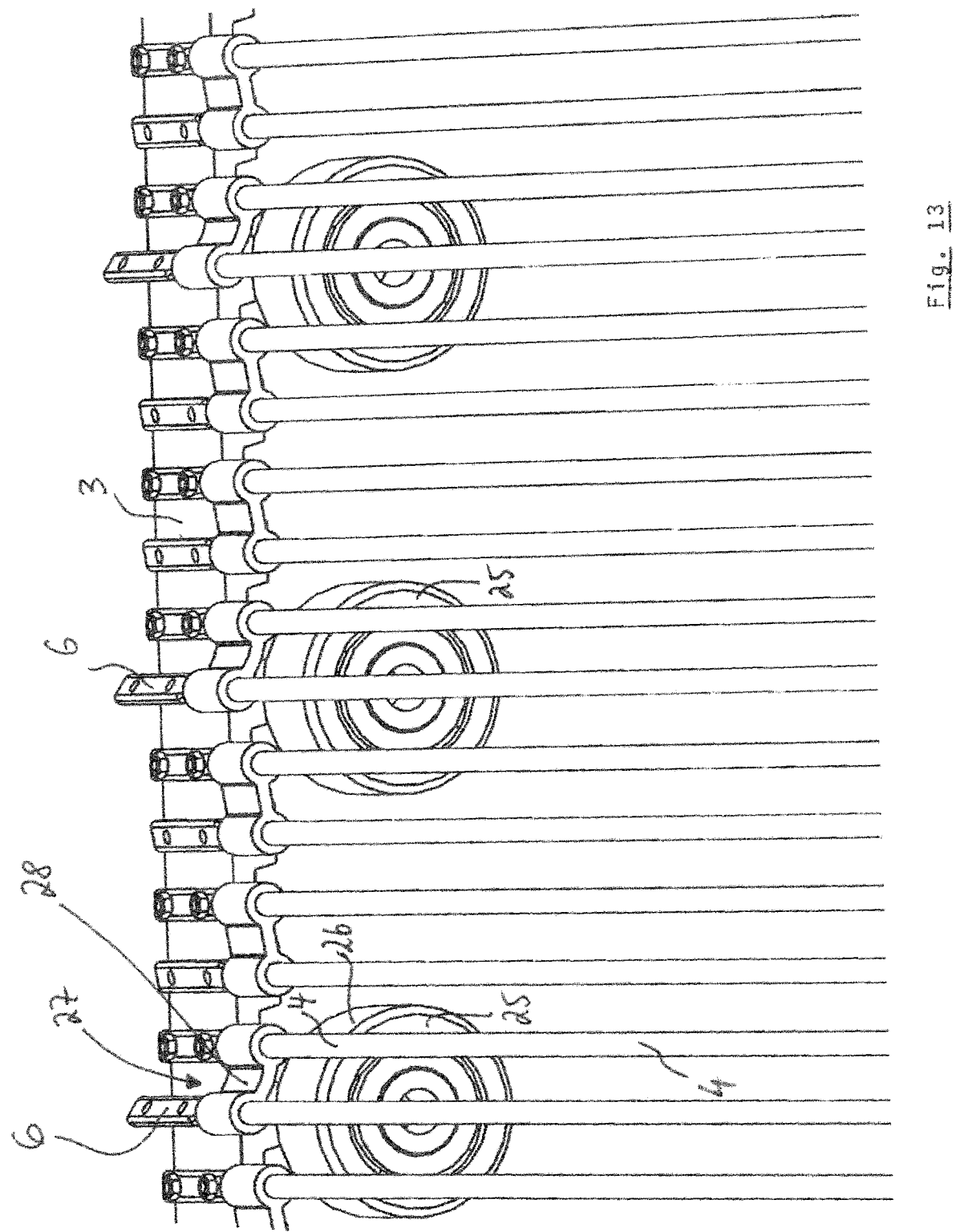
FIG. 13: shows a partial view of subject matter according to FIG. 12.

According to FIG. 13, the rollers 25 are positioned in the direction of the axis of rotation or the longitudinal direction of the screening position to such an extent that an outer surface 26 of the rollers, which is a guide surface, enters into contact with the screening bars and therefore laterally next to the connection 27 between a screening bar 4 connected fixedly to an endless carrier 3 and a movable screening bar 6. The screening bar 6 is wider than the screening bars according to the exemplary embodiment according to FIG. 1. Without the influence of the positioning means, the bars 6 rest on the endless carrier 3 owing to gravity, but also because of the rigidity of the joint part 28, which is produced from polyurethane. The screening bar 6 is deflected counter to the joint part 28 only by means of the positioning means.

Figure 14:
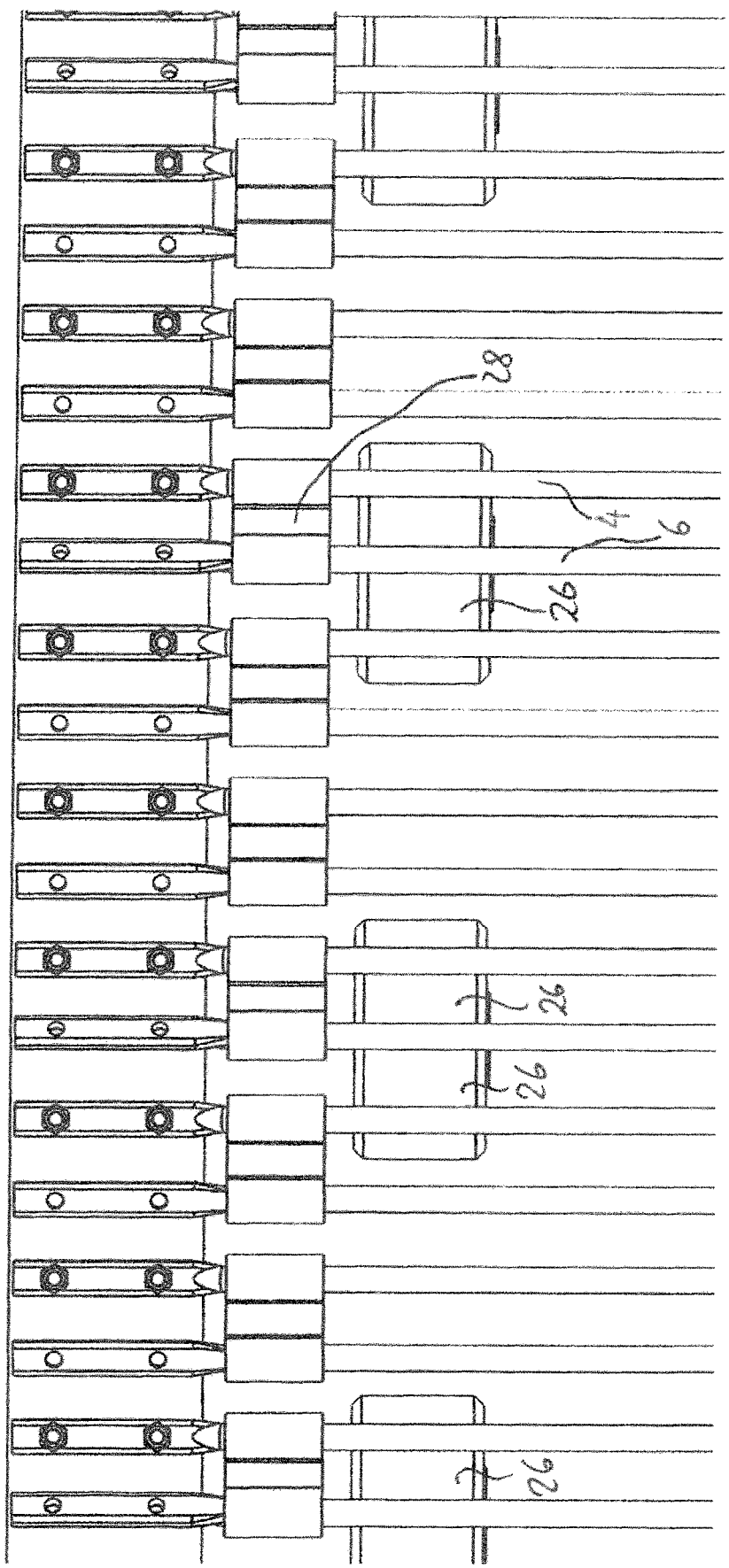
FIG. 14: shows the subject matter according to FIG. 12 in a partial top view.

The two ends of the screening bars 6 rest on the endless carriers, as seen in the conveying direction. The positioning means having rollers are likewise preferably arranged at least with the contact surfaces on the inside of the joints (cf. FIG. 14). The rollers can be adjusted in particular via adjusting means, not illustrated, in a direction vertically to the plane of FIG. 14, and therefore the change in the screening bar spacings associated with the relative movement of the screening bars 6 can be varied.

In the embodiment of the invention that is illustrated by FIGS. 20 to 23, the screening bar unit 11 or the flap unit has a shoulder element 43 which has the outer surface configured for resting on the positioning means 13. The shoulder element has an extent E transversely to the plane 42 which, in a side view or a longitudinal section, coincides with the straight line 20 (cf. inter alia, FIG. 9) (and coincides only in the central position with the conveying surface 40). A longitudinal centre axis 46 of the movable screening bar 6 and a longitudinal centre axis 44 are arranged in the plane 42. In the case with the flap element, the longitudinal centre axis 44 is the longitudinal centre axis of a receptacle 48 (cf. FIG. 9 too). In the case of the screening bar unit 11, the longitudinal centre axis 44 is the longitudinal centre axis of the immovable screening bar 4. In the embodiment shown, the extent E of the shoulder element 43 is at least 50% of the spacing D of said longitudinal centre axes 44, 46 from each other. The shoulder element 43 is formed here integrally with the joint part 12.

In an alternative embodiment of the invention that is illustrated by FIGS. 16 to 19, the movable screening bar 6 of the flap unit or of the screening bar unit 11 has a profile bent from the joint part. For this purpose, the screening bar has, in the central region, a rectilinear centre portion running parallel to the fixed screening bar 6 and regions which adjoin the latter laterally, run at least partially vertically thereto and adjoining the joint part 12. A centre portion longitudinal centre axis 47 about which the central rectilinear region extends has a spacing C which corresponds to at least 25% of the spacing D from the joint part 12 in the side view according to FIGS. 16/17. The spacing D describes the distance of the centre portion longitudinal centre axis 47 from the longitudinal centre axis 44 of the receptacle 48 or of the screening bar 4.

Figure 21:
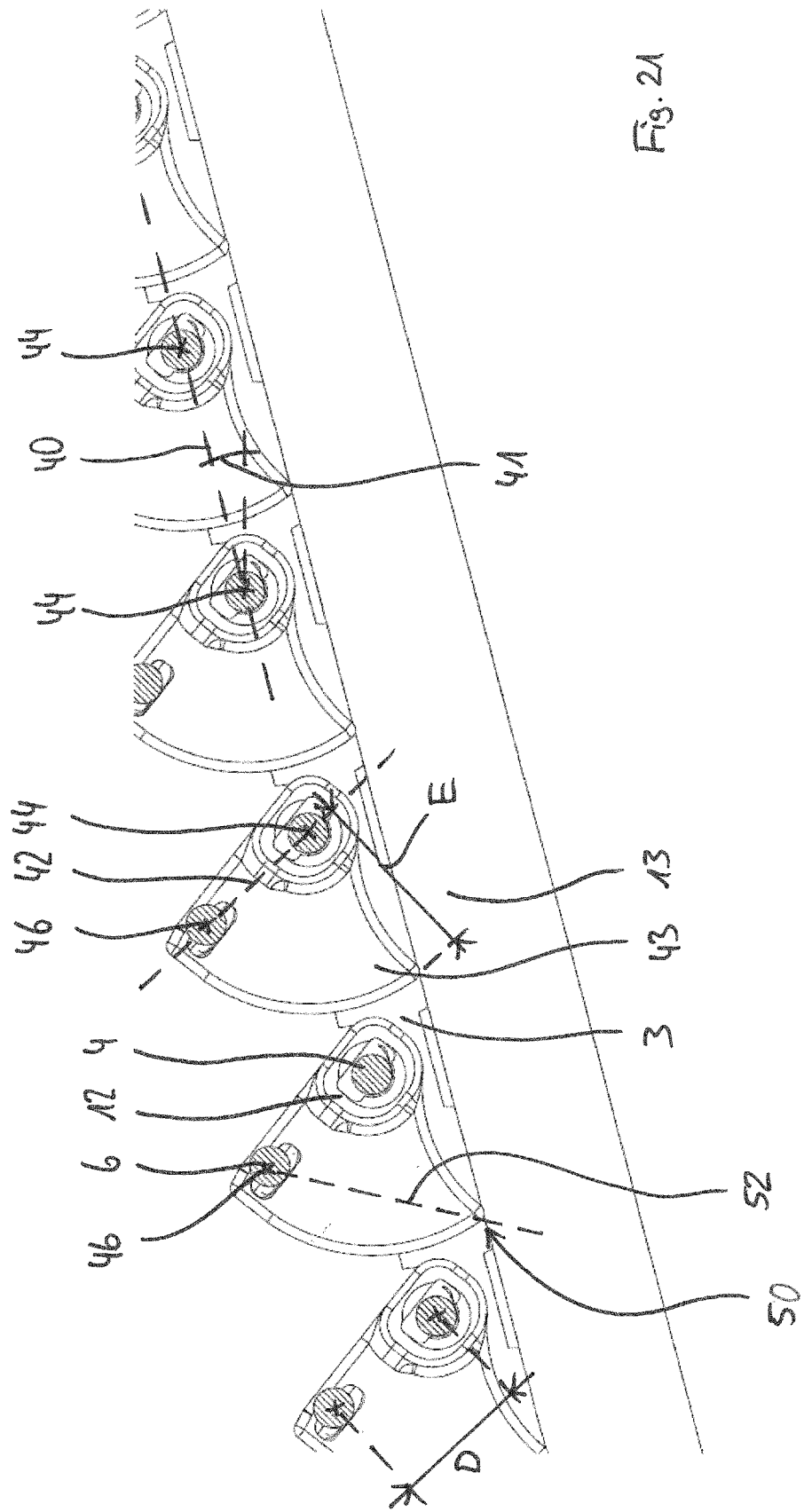
FIG. 21: shows the subject matter according to FIG. 20 in a detailed illustration.
Figure 22:
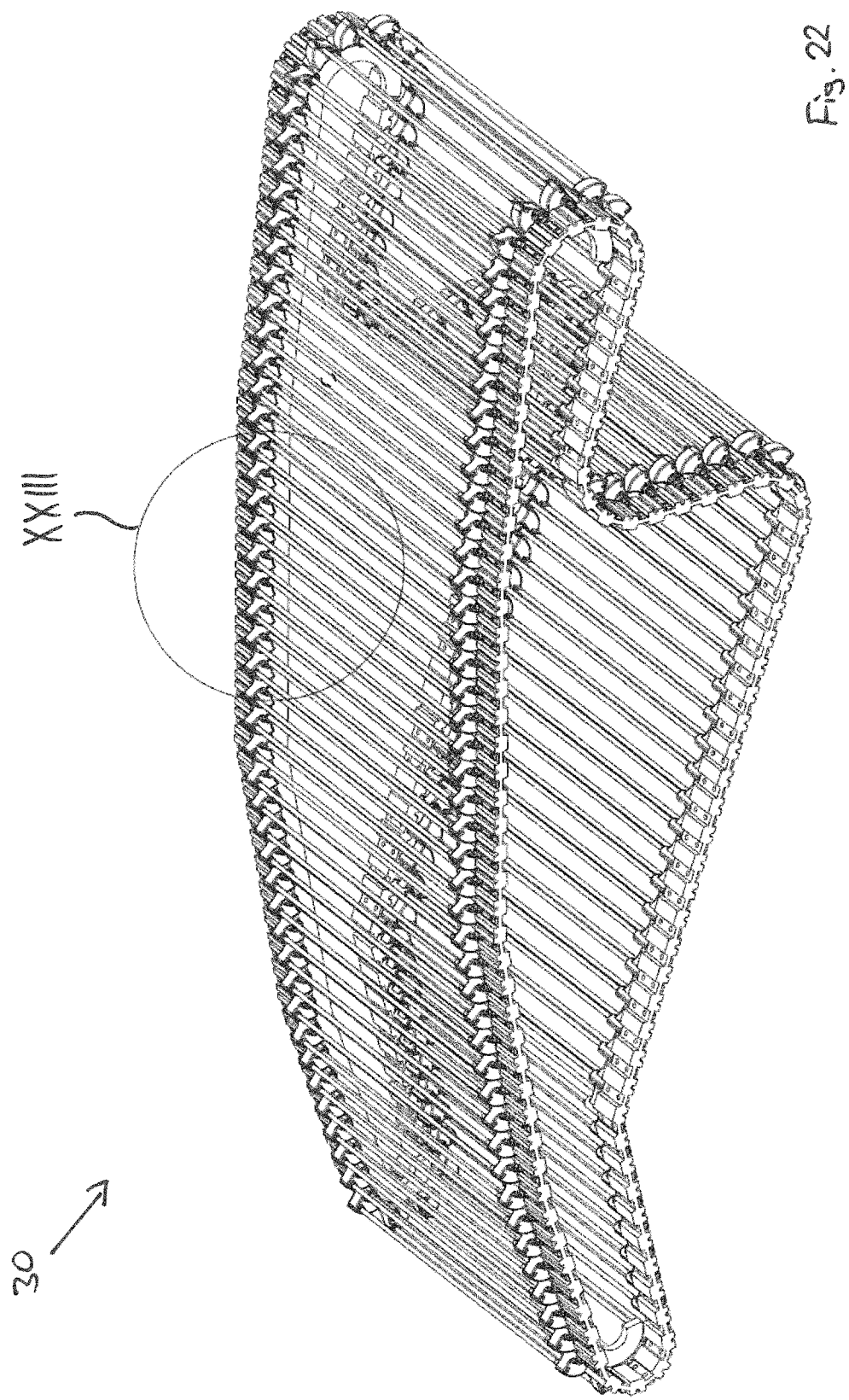
FIG. 22: shows the subject matter according to FIG. 20 in a perspective view.

A supporting axis 52 which is illustrated in FIG. 21 and intersects the longitudinal centre axis 46 of the movable screening bar 6 and a central position contact region 50 and is arranged orthogonally to the longitudinal centre axis 46 encloses an angle of at least 70° in the central position with the conveying direction or the conveying surface or, irrespective of the position, with the plane 42. The central position contact region 50 is that part of the outer surface of the joint part 12 which rests on the positioning means 13 in the central position.

Figure 15:
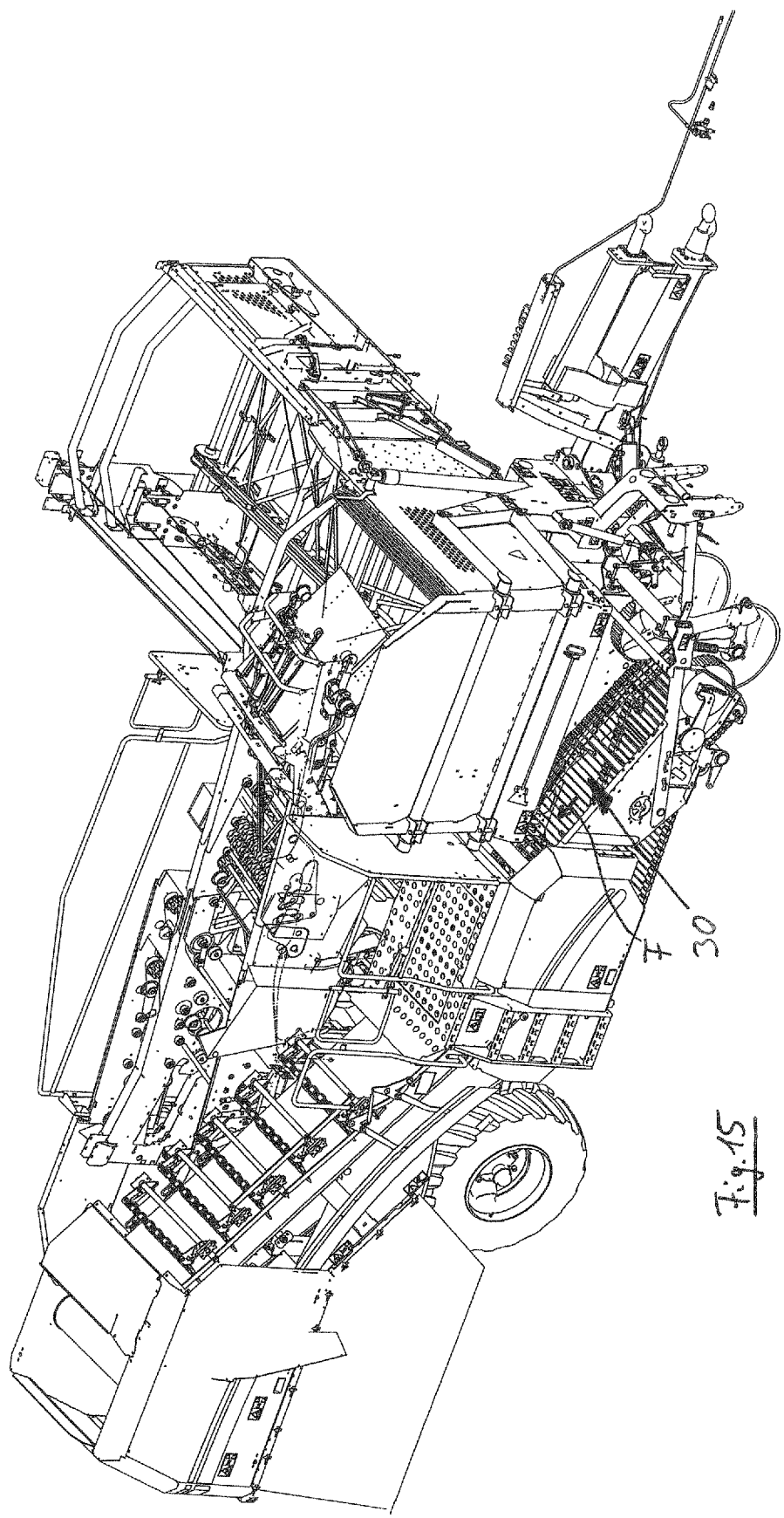
FIG. 15: shows further subject matter according to the invention.
Figure 16:
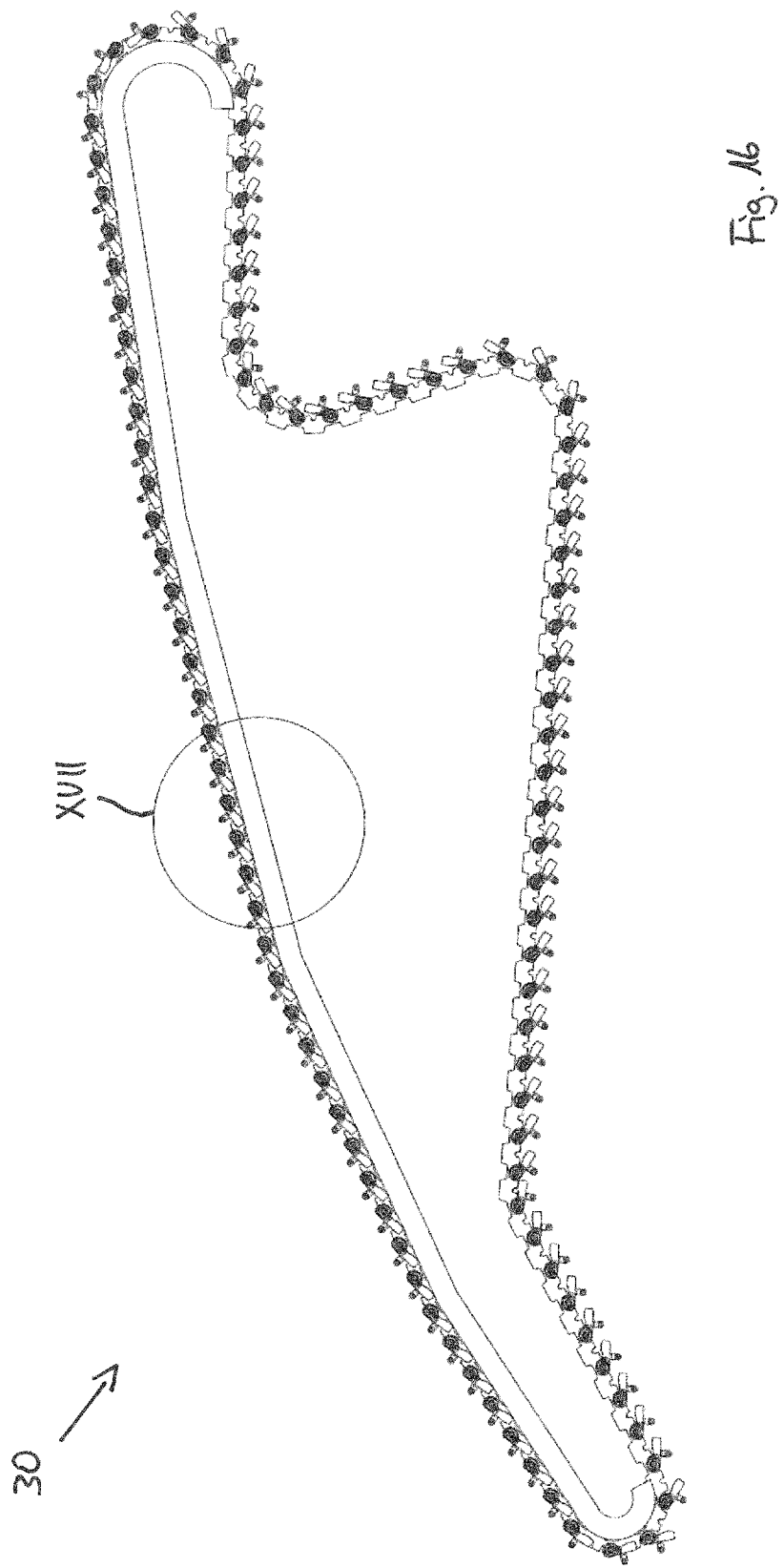
FIG. 16: shows further subject matter according to the invention in a longitudinal section.
Figure 17:
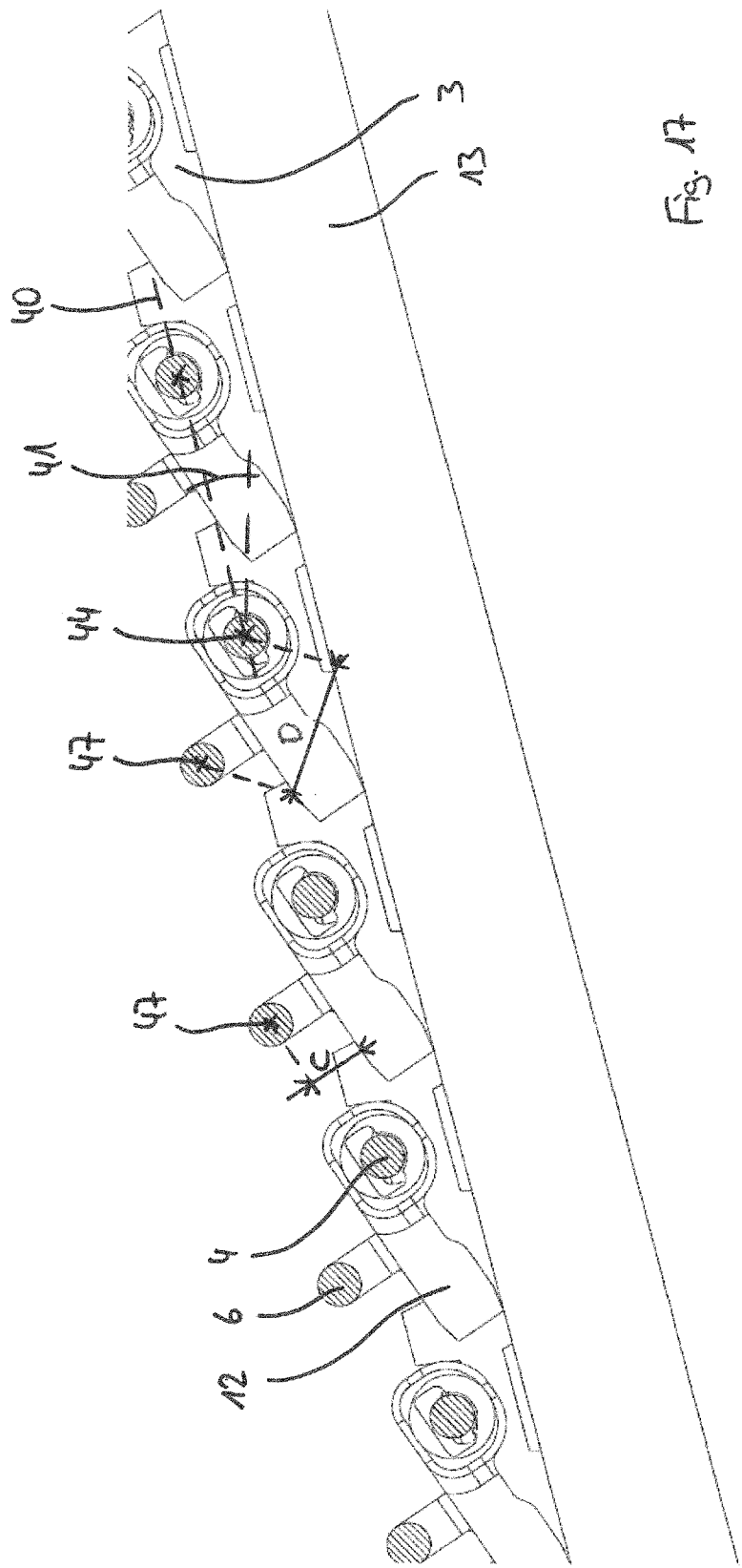
FIG. 17: shows the subject matter according to FIG. 16 in a detailed illustration.
Figure 18:
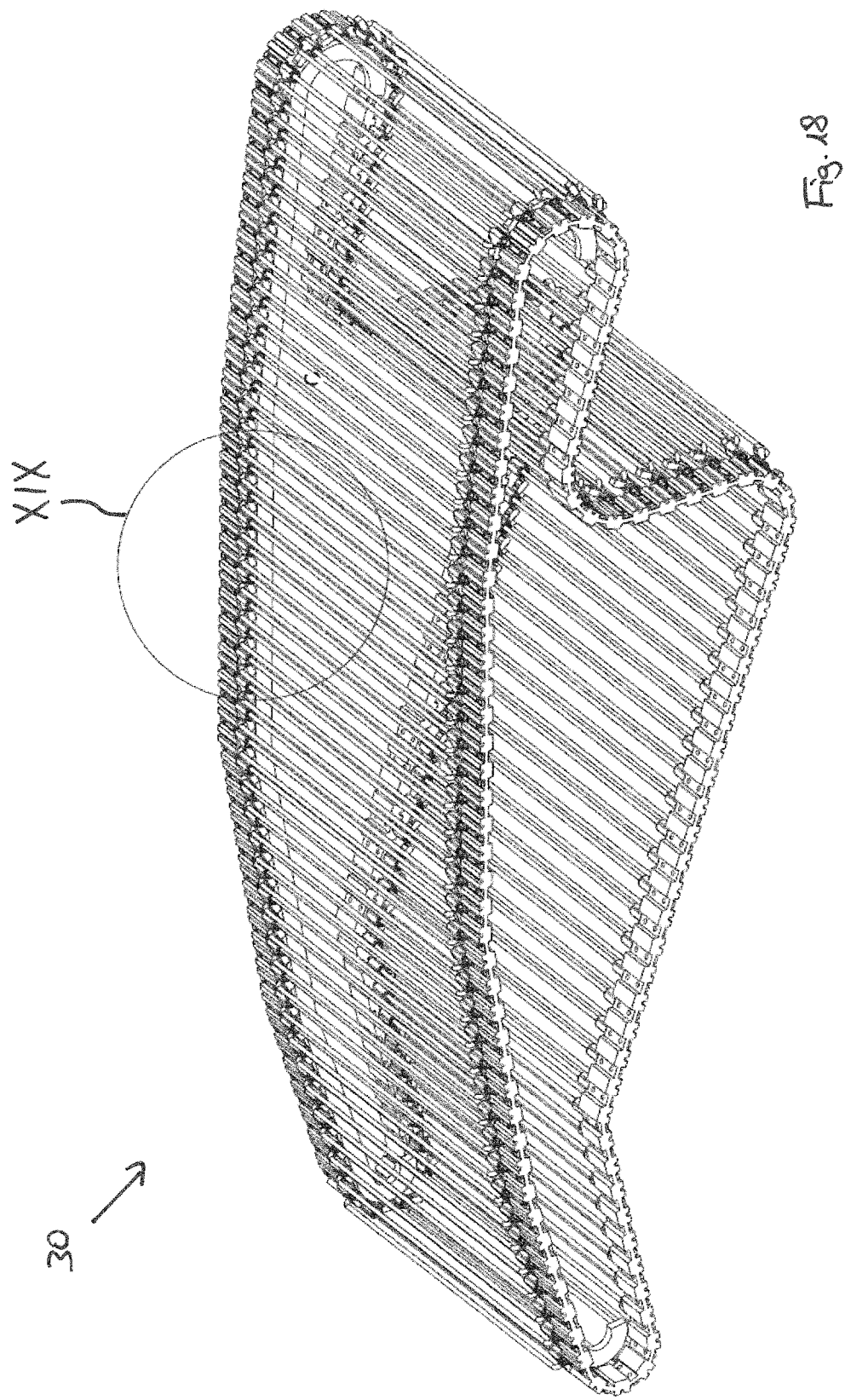
FIG. 18: shows the subject matter according to FIG. 16 in a perspective view.
Figure 19:
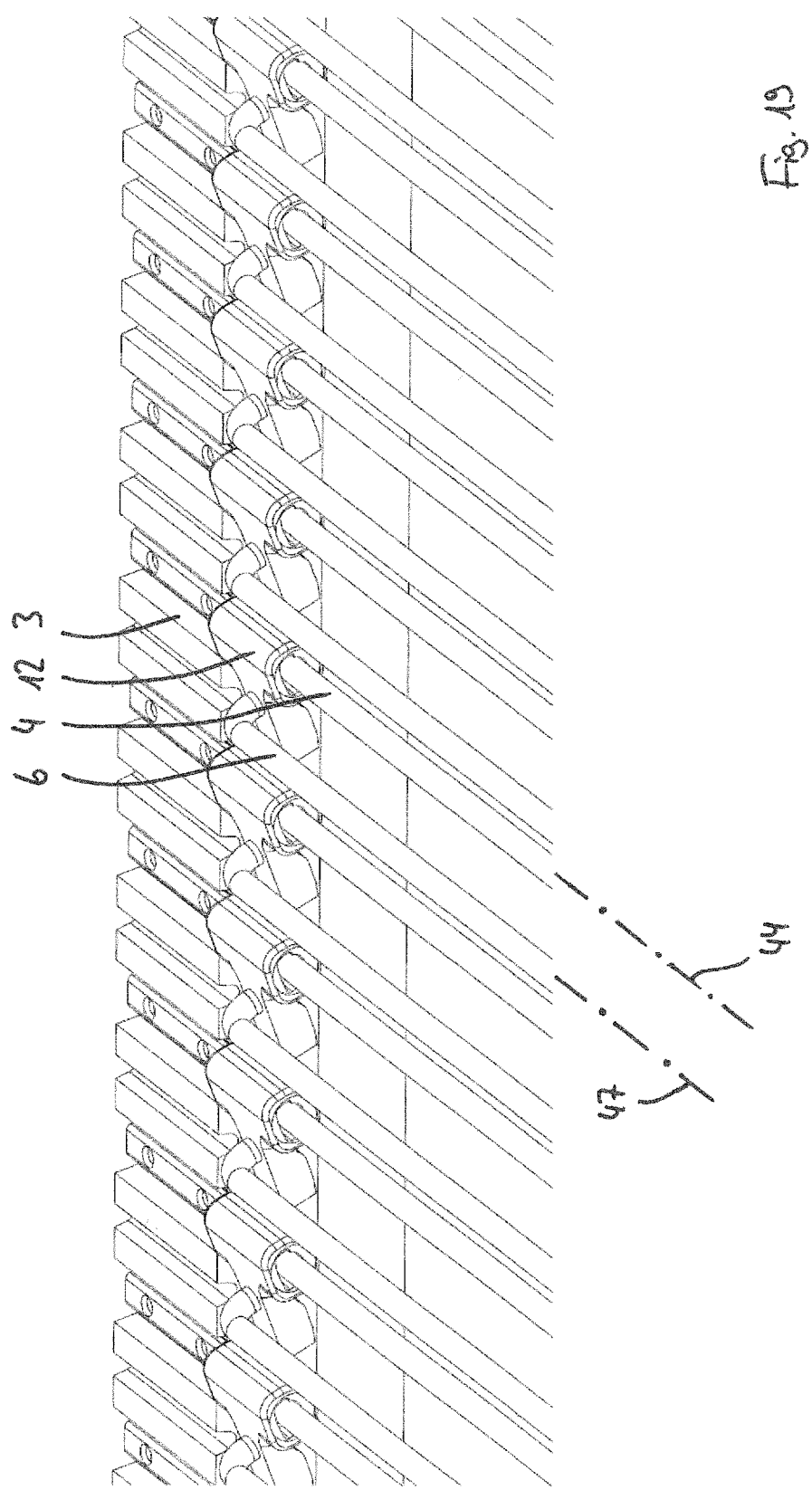
FIG. 19: shows the subject matter according to FIG. 16 in a further detailed illustration.
Figure 20:
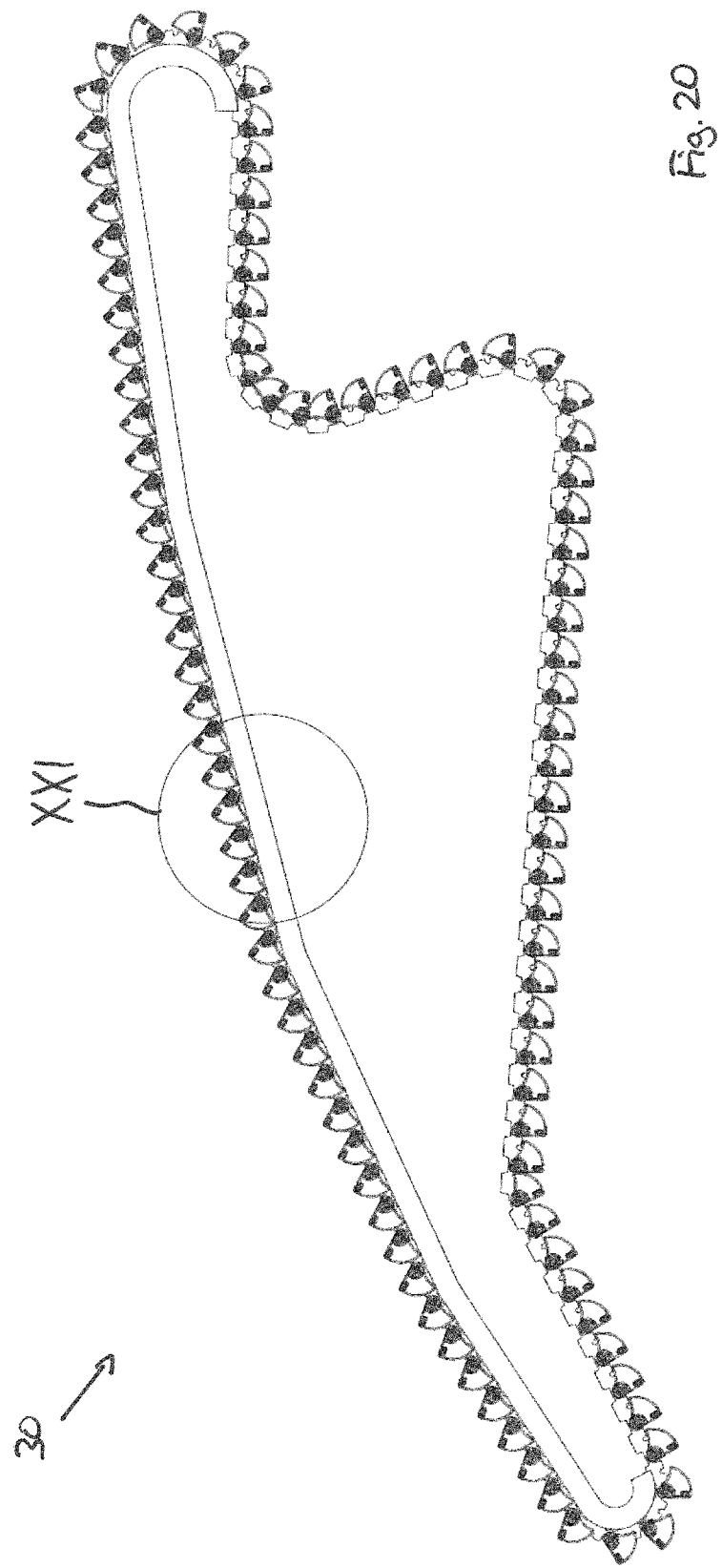
FIG. 20: shows further subject matter according to the invention in a longitudinal section.

A harvesting machine according to the invention (FIG. 15), here for harvesting potatoes, has a conveying section which is formed by a previously described screening belt unit 30 and has a conveying direction F initially running substantially counter to the direction of travel. The harvesting machine has an inclination sensor, not illustrated, which is assigned to the screening belt unit 30 and is coupled to the adjusting member 14 (cf., inter alia, FIG. 2). The harvesting machine is designed in such a manner that, as the measured inclination of the harvesting machine increases, an automatic adjustment of the positioning means 13 can be initiated.

The invention claimed is:

1. A screening belt unit for a harvesting machine or harvested material transportation device for screening extraneous material out of a mixture of harvested material and extraneous material, the screening belt unit comprising:
a screening belt having at least two endless carriers between which screening bars are arranged in a direction transversely to a conveying direction F,
said screening bars forming a plurality of screening bar units that comprise in each case at least two screening bars, wherein at least a part of the screening bars is fixed so as to be movable relative to the endless carriers; and
a positioning means arranged at least locally along the screening belt and acting on the movable screening bars and via which, in a screening zone S, as seen in the screening direction a spacing A in the conveying direction F of successive screening bars is defined and settable in a variable manner;
wherein at least one joint part is fixed releasably to a said screening bar of a said screening bar unit, wherein the joint part or the screening bar has an outer surface configured to rest on the positioning means, wherein the joint part is configured such that the said screening bar is pivotable up by an angle (W) of at least 30° from a center position, wherein in the center position a longitudinal center axis of the said screening bar is arranged in the same plane as longitudinal center axes of an adjacent screening bar upstream or downstream of the said screening bar in the conveying direction F, said adjacent screening bar being non-pivotable.

2. The screening belt unit according to claim 1, wherein at least a part of the screening bar unit is variable in position relative to the endless carrier by the positioning means.

3. The screening belt unit according to claim 1, wherein the screening bar unit has a screening bar that is mounted in the screening bar unit eccentrically in a cross section perpendicular to the conveying direction.

4. The screening belt unit according to claim 1, wherein the positioning means is configured in a multipart manner in the screening zone.

5. The screening belt unit according to claim 1, wherein the screening bars of a screening bar unit are at a fixed spacing from one another.

6. The screening belt unit according to claim 1, wherein at least one of the movable screening bars is at different spacings from the upstream or downstream immovable screening bars in a central position in which the longitudinal center axis of the one movable screening bar is arranged in one plane with the longitudinal center axes of screening bars which are arranged upstream and downstream in the conveying direction F and are immovable relative to the endless carriers.

7. The screening belt unit according to claim 1, wherein the positioning means moves with the screening belt.

8. The screening belt unit according to claim 1, wherein at least 25% and up to 75% of the screening bars are configured to be variable in position relative to the endless carrier.

9. The screening belt unit according to claim 1, further including a guide unit that limits the variation in position in particular on account of centrifugal force.

10. The screening belt unit according to claim 1, wherein the positioning means is configured to be at least partially strip shaped.

11. The screening belt unit according to claim 1, further including a plurality of positioning means.

12. The screening belt unit according to claim 1, wherein the positioning means comprises a roller.

13. The screening belt unit according to claim 12, wherein the roller in the upper strand is configured to push up at least the screening bars that are fixed so as to be movable relative to the endless carriers.

14. The screening belt unit according to claim 13, wherein the screening bars that are configured so as to be movable relative to the endless carriers (3) rest in the upper strand on the endless carriers.

15. The screening belt unit according to claim 1, wherein each screening bar unit has at least one flap unit having at least one of the two screening bars, the flap unit being pivotable or rotatable via at least one joint connected to the endless carrier and provided in particular with a flexible joint part, and the positioning means influencing an angular position of the flap unit.

16. The screening belt unit according to claim 15, wherein the positioning means is configured to limit in particular gravity related pivoting or rotation of the flap units.

17. The screening belt unit according to claim 15, wherein at least one adjusting member is assigned to the positioning means, via which the spacing of at least one part, guiding the flap unit, of the positioning means with respect to the endless carrier is settable.

18. The screening belt unit according to claim 15, wherein one screening bar of each screening bar unit is fixed to the endless carriers and forms a part of two joints for the attachment of the flap unit.

19. The screening belt unit according to claim 15, wherein the positioning means has, in the screening zone S, at least one guide surface for the flap units to rest on.

20. The screening belt unit according to claim 19, wherein the guide surface, as seen perpendicularly to the conveying direction F, is arranged next to the endless carriers.

21. The screening belt unit according to claim 19, wherein the guide surface, in order to create a selectively variable spacing A, is provided with a non-flat profile.

22. The screening belt unit according to claim 19, wherein at least one portion of the guide surface is configured such that its spacing from a conveying surface, which is spanned by the longitudinal center axes of screening bars that are immovable relative to the endless carriers, increases or decreases continuously in the conveying direction F and/or depending on a pitch angle B of the conveying surface.

* * * * *